United States Patent
Saalfeld et al.

(10) Patent No.: US 10,944,834 B1
(45) Date of Patent: Mar. 9, 2021

(54) SOCKET PEERING

(71) Applicant: Amazon Technologies, Inc., Seattle, WA (US)

(72) Inventors: Christoph Saalfeld, Seattle, WA (US); Tristam Kyle MacDonald, Boston, MA (US); Gary Wicker, Seattle, WA (US); Justin Robert Knoepfler, Seattle, WA (US); Kyle Michael Roche, Mercer Island, WA (US); Frank Lovecchio, Seattle, WA (US); Bryant Cutler, Maple Valley, WA (US); Qing Ju, Bellevue, WA (US); Shyam Krishnamoorthy, Redmond, WA (US); Alexandra Elizabeth Baoboe Lee, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 291 days.

(21) Appl. No.: 15/391,547

(22) Filed: Dec. 27, 2016

(51) Int. Cl.
*H04L 29/08* (2006.01)
*G06F 9/54* (2006.01)

(52) U.S. Cl.
CPC ............ *H04L 67/146* (2013.01); *G06F 9/542* (2013.01); *H04L 67/1095* (2013.01)

(58) Field of Classification Search
CPC .... H04L 67/146; H04L 67/1095; G06F 9/542
USPC ........................................................ 709/228
See application file for complete search history.

(56) References Cited

U.S. PATENT DOCUMENTS

| | | | |
|---|---|---|---|
| 7,305,546 B1 * | 12/2007 | Miller ................... | H04L 63/029 713/153 |
| 7,830,804 B2 | 11/2010 | Kavanaugh et al. | |
| 9,015,036 B2 | 4/2015 | Dupre et al. | |
| 2003/0002508 A1 | 1/2003 | Dierks, Jr. et al. | |
| 2003/0115357 A1 * | 6/2003 | Chu ........................ | H04L 29/06 709/237 |
| 2005/0165932 A1 * | 7/2005 | Banerjee ................. | G06F 9/544 709/226 |
| 2006/0045098 A1 | 3/2006 | Krause | |
| 2006/0047821 A1 * | 3/2006 | Kim ........................ | H04L 69/16 709/227 |
| 2006/0142005 A1 | 6/2006 | Takaluoma et al. | |
| 2007/0133582 A1 | 6/2007 | Banerjee et al. | |
| 2007/0248056 A1 | 10/2007 | Feng et al. | |
| 2009/0172172 A1 | 7/2009 | Graham et al. | |
| 2011/0231918 A1 | 9/2011 | Shah et al. | |

* cited by examiner

*Primary Examiner* — Kevin S Mai
(74) *Attorney, Agent, or Firm* — Robert C. Kowert; Kowert, Hood, Munyon, Rankin & Goetzel, P.C.

(57) ABSTRACT

A socket service may be used to link a peer socket to another peer socket. The peer socket is for communicating data to and from a client device and the other peer socket is for communicating data to and from another client device. If a socket opens and the corresponding peer socket is not yet open then the socket waits for the corresponding peer socket to open. When a client device requests a socket to be opened, the client device requests a particular client-defined function mapping to be associated with the socket. When the socket is opened, the endpoint specified in the client-defined function mapping is invoked. An identifier associated with the client device is sent to the endpoint. If the endpoint returns a socket identifier for another socket, then the socket service links the peer socket to the other peer socket, linking the client device to another client device.

20 Claims, 19 Drawing Sheets

| Client Function Mapping Data 310 |||||
|---|---|---|---|---|
| Account ID | Port Number | Endpoint ID | Receive Criteria | Idle Timeout |
| 1357 | 9000 | SVC123 | 128KB, 30 Seconds | 30 Minutes |
| 1357 | 9001 | EXT456 | 32KB, 15 Seconds | 10 Minutes |
| 1357 | 9002 | CPT789 | 64KB, 90 Seconds | 15 Minutes |

SOCKET PEERING

BACKGROUND

With the increased availability of a variety of computing devices that access the internet, many new applications have been developed that leverage internet connectivity and remote provider networks. Computing devices may be stand-alone systems or may be embedded in a variety of products, such as home appliances, manufacturing devices, printers, automobiles, thermostats, smart traffic lights, etc. Many client devices make use of a long-lived connection with a server in order to stream data from the client device to the server and from the server to the client device whenever data needs to be transmitted.

Applications may use various communication protocols, including custom protocols, to implement long-lived connections to multiple client computing devices. For example, a device management application may allow a client to manage thousands of client devices. In many cases, an application provider may need to run a large fleet of servers to listen to the communication protocols and to manage identities and credentials in order to accept connection requests for numerous client devices. Thus, a complicated and costly computer infrastructure may be required in order for an application provider to listen for incoming traffic and to maintain a large number of secure connections for clients.

In some cases, a computing device may communicate with another computing device to provide a stream of data to the other computing device or to send messages back and forth. For example, an audio-visual feed from a security camera may be sent to a remote storage location to store the videos for later use. In order to set up the camera to transmit audio-visual data to a remote storage device, an intermediary infrastructure is required to provide a communication path to transmit the data. For example, software applications may implement various function calls to route data from one device to another device. The process of configuring and modifying the intermediary infrastructure to route data from one device to another device using the appropriate communication protocols can be a burdensome process, particularly for a client that implements a large number of devices.

BRIEF DESCRIPTION OF THE DRAWINGS

FIG. 5 illustrates an example data structure that stores client-defined function mappings, according to some embodiments.

Figure 1:
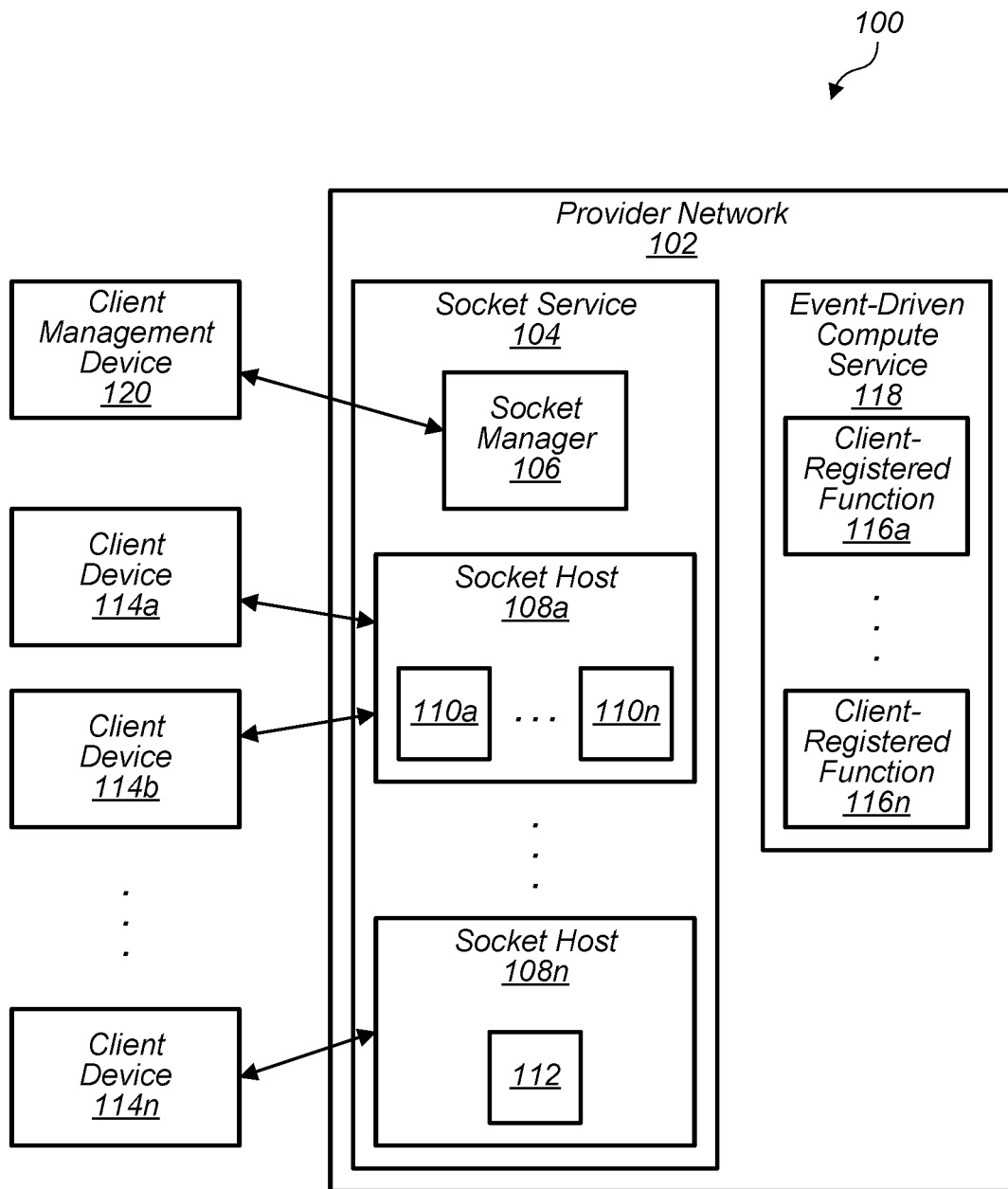
FIG. 1 illustrates a system for managing secure sockets for client devices, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement managed secure sockets and socket peering for client devices. In response to a connection request from a client device, a socket service of a provider network authenticates the client device, determines a client function mapping, opens a socket at a socket host, applies the client function mapping to the socket, and sends a socket ID to an endpoint specified by the client function mapping data (e.g., an endpoint for an event-driven compute service, or some other endpoint).

If the socket is a peer socket for a peer client device, then the socket is linked to the corresponding peer socket for the corresponding peer client device or waits for the corresponding peer socket to open. If the socket is not a peer socket, the socket listens for and receives incoming data from the client device and stores the incoming data in a buffer. When one or more receive criteria are met for data received and stored in the buffer, the socket service sends the socket ID and buffer data to the endpoint specified by the client function mapping data. If return data is received at the socket, the socket service transmits the return data to the client device. In some embodiments, the socket may receive data from an endpoint asynchronously (e.g., via an API call), and transmit the data to the client device.

In embodiments, the endpoint is an endpoint for an event-driven compute service of the provider network. The event-driven compute service may include one or more client-registered functions, wherein one of the client-registered functions is the endpoint. Thus, in response to opening a socket or in response to one or more receive criteria being met, one of the client-registered functions may be invoked, wherein the function receives the socket ID and/or buffer data. In embodiments, a client-registered function includes code specified by the client that is to be executed by resources of the provider network (e.g., one or more computing devices), even though the client may be unaware of what the resources are.

In some instances, the client and/or the client device is unaware of aspects of the event-driven compute service and/or how the event-driven compute service is implemented. For example, to implement the client-registered function, the event-driven compute service may execute code on one or more computing devices of the provider network, wherein the client and/or the client device is unaware of the identity and/or network address of the one or more computing devices. Thus, in embodiments, the client-registered function and/or other code may be executed by in response to events (e.g., opening a socket or when one or more receive criteria are met for a socket), without the client having to manage, own, or run dedicated servers to execute code on.

In other embodiments, the endpoint is an endpoint for a compute instance of the provider network. For example, the endpoint may be a function or other endpoint for the compute instance. Thus, the client and/or the client device may be aware of the identity and/or network address of the compute instance and/or the one or more computing devices implementing the compute instance. In some cases, the endpoint is an endpoint for an external function provider that is located external to the provider network. For example, the endpoint may be a function or other endpoint for the external function provider. In embodiments, the external function provider may be a remote server or one or more other remote computing devices. In some embodiments, the compute instance or the external function provider may receive the data from the socket, process the data, and in at least some instances, send data to or fetch data from the socket (synchronously or asynchronously).

In various embodiments, a secure socket service enables true server-less applications by enabling applications that need continuously open connections to client devices that need to be able to receive and send data over the connections at any point in time. Without the use of a socket service, a client that needs to use particular protocols (e.g., custom protocols and/or non-HTTP protocols) may need to manage its own a fleet of servers to listen to the particular protocols and to manage identities and security credentials for the fleet of servers in order to accept and/or authenticate client devices to establish connections. However, as described below, embodiments may allow a client to listen for incoming traffic for one or more different protocols (e.g., custom protocols, HTTP, and/or non-HTTP protocols) and to keep large numbers of client devices securely connected without the requirement for additional server infrastructure that needs to be managed by the client.

In some instances, subsequent to sending data from a socket to an endpoint (e.g., invoking a client registered function or other function for an endpoint), the socket can be accessed via a set of APIs to read from, write to, or close the socket. In embodiments, a socket may be accessed from any service within the provider network or external to the provider network that has rights to interact with the socket. This may enable clients to build applications that need to manage a large number of long-lived connections (e.g., for gaming or mobile device management scenarios) and to continue to use particular protocols by allowing access to the raw byte stream over sockets for the connections. Thus, in embodiments, a socket service allows for server-less architectures to communicate with client devices that talk arbitrary binary protocols over long-lived connections (e.g., transmission control protocol (TCP) connections). In embodiments, any standard or custom communication protocol or internet protocol may be implemented for sockets and for the associated connection between a client device and a socket host (e.g., TCP, HTTP, message queuing telemetry transport (MQTT), transport layer security (TLS), and any custom protocol).

In embodiments, a client device may be any type of internet-connectable client device (e.g. any device capable of connecting, via the internet, to a compute host of a remote provider network). In various embodiments, one or more internet-connectable devices receive one or more commands (or any other data, requests, etc.) from and/or send data (commands, requests, or any other data) to respective sockets of respective socket hosts over respective connections. For example, 100 client devices may each receive commands and/or send data to a particular socket host over 100 respective connections for respective sockets, and 200 other client devices may each receive commands from and/or send data to another socket host over 200 respective connections for respective sockets.

As the number of client devices, applications, and protocols increases, the benefits of using a socket service increase. As discussed, embodiments allow a client to reduce or eliminate the need to own or manage servers dedicated to handling communication for particular protocols for client devices. Additionally, through the use of socket peering, peer client devices may be connected by the socket service at the provider network, without the need for a client or provider network to use additional computing infrastructure. Thus, various embodiments provide ways for clients to reduce cost, reduce network delays and traffic, reduce communication errors, and reduce the amount of computing infrastructure/devices required to implement applications that leverage long-term connections with client devices.

FIG. 1 illustrates a system 100 for managing secure sockets for client devices, according to some embodiments. The provider network 100 depicted in FIG. 1 may be the same type of provider network, and include some or all of the same components as other provider networks depicted in FIGS. 1-16, in embodiments.

In the depicted embodiment, the provider network 102 includes a socket service 104. The socket service 104 includes a socket manager 106 and the socket hosts 108a-108n that each may host one or more sockets for communicating with respective client devices. In the depicted example, the socket host 108a hosts sockets 110a-110n and the socket host 108n hosts the socket 112. Each of the sockets may be used to receive data at a socket host 108 from a client device 114 or to send data from a socket host 108 to a client device 114 using a respective connection (e.g., TCP connection and/or TLS connection) between a respective client device 114, wherein a respective socket host 108 hosts the respective connection. For example, the socket 110a may receive data from or send data to the client device 114a, the socket 110n may receive data from or send data to the client device 114b, and the socket 112 may receive data from or send data to the client device 114n. In embodiments, a socket may be read from and/or written to (or any other operation) via representation state transfer (REST) APIs following the Berkeley sockets (BSD) socket operations paradigm. However, any other technique may be used to read from a socket, to write to a socket, or to perform other operations associated with a socket.

In embodiments, one or more of the sockets may each be associated with one or more client-registered functions 116 of the event-driven compute service 118. For example, when the socket 110a is opened or when one or more receive criteria are met for data received and/or stored in a buffer for the socket 110a, the socket service 104 may send data, such as a socket ID of the socket 110a and/or buffer data to the client registered function 116a. The client registered function 116a may then be invoked to process the received data. In some cases, results of the processing may be returned to the socket 110a as return data (e.g., as a synchronous write/return of data).

In some instances, data may be written to a socket or read from a socket asynchronously. For example, the event-driven compute service 118 may send data to the socket 110a in response to an event or process at the event-driven compute service 118 (e.g., independent of any particular data received from or sent to the socket 110a). Similarly, the event-driven compute service 118 may read or fetch data from the socket 110a in response to an event or process at the event-driven compute service 118 (e.g., independent of any particular data received from or sent to the socket 110a).

As discussed below, in some embodiments, a different endpoint than the client-registered function 116 of the event-driven compute service 118 may be used to receive, process, and/or send data to a socket 110 (e.g., an endpoint for a compute instance of the provider network or an endpoint for a function provider external to the provider network 102). In various embodiments, an endpoint may be any function (e.g., code stored and/or executing on a computing device), the computing device itself, a logical network address that identifies the function or computing device or identifies an address to send data to for the data to be processed, or any other suitable software and/or hardware resource capable of processing data that is received by a socket.

In the example embodiment, a client management device 120 may be used to configure how each socket of the socket hosts 108 operates. For example, the client management device 120 may establish a connection with the socket manager 106 and send data and/or commands to the socket manager 106 to enter or modify client function mapping data for a particular socket. As discussed below, the client function mapping data for a socket specifies an endpoint for the socket to send data to and may also specify one or more configuration parameters for the socket.

In some embodiments, the socket service 104 may send an indication and/or data to an endpoint (and causing a function to be invoked) in response to some or any of the socket events described (e.g., opening a socket, closing a socket, receiving data at the socket, sending data from the socket, etc.). In embodiments, to send data to an endpoint the socket service 104 may specify a network address associated with the endpoint, a name associated with the endpoint, a combination of a network address and a name, or any other identifier suitable for routing data the endpoint and/or receiving data from the endpoint.

Figure 2:
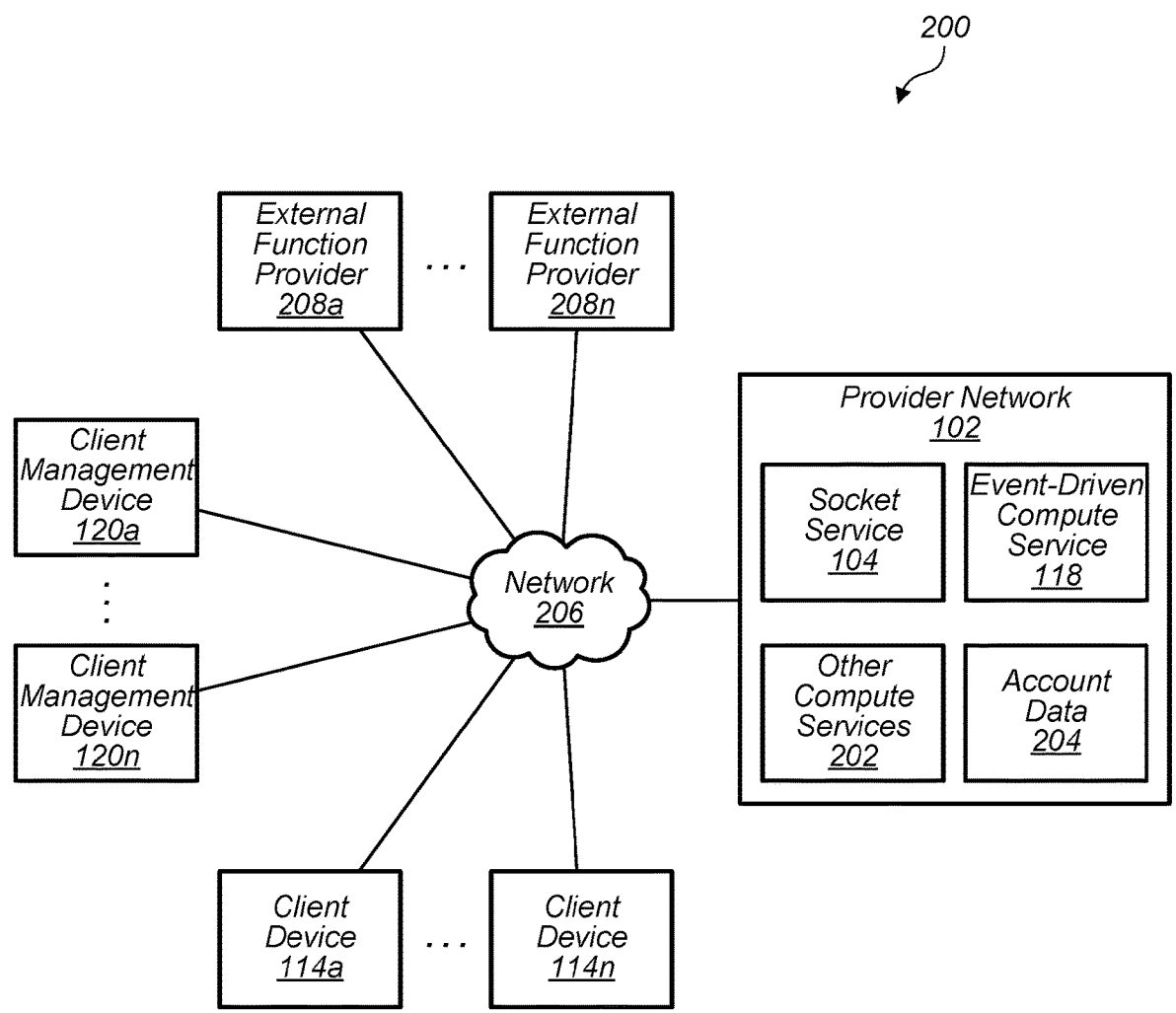
FIG. 2 illustrates a system for managing secure sockets for client devices using resources of a provider network and external function providers, according to some embodiments.

FIG. 2 illustrates a system 200 for managing secure sockets for client devices using resources of a provider network and external function providers, according to some embodiments. In the depicted embodiment, the provider network 102 includes the socket service 104, the event-driven compute service 118, other compute services 202, and account data 204. The compute services 202 may include any number of services suitable for providing to remote client devices, such as compute instances, database instances, etc. The account data 204 may include any data suitable for identifying and/or authenticating clients of the provider network 102 or client devices used by the clients. The account data may include data associated with any services used by the clients and/or the client devices.

In the example embodiment, one or more of client devices 114a-114n may have a connection with a respective socket host 108 for a respective socket, via an intermediate network 206 (e.g., a wide-area network, such as the internet). In the embodiment, one or more of the client management devices 120a-120n may have a connection with one or more hosts that host a respective socket manager. In some embodiments, a socket manager 106 may be hosted by a socket host 108. In the depicted embodiment, one or more of external function providers 208a-208n may have a connection with one or more respective hosts of the socket service 104.

As discussed above, the socket service 104 may communicate with the event-driven compute service 118, other compute services 202, client devices 114, client management devices 120, and external function providers 208. The socket service 104 may also retrieve data associated with a client from the account data 204 or store data associated with a client into the account data 204 (e.g., client identifiers, client device identifiers, client authentication data).

In embodiments, a client may use a client management device 120 to send configuration information for sockets (e.g., for client-defined function mappings) and other information to control and configure the socket service 104. For example, a client may register and/or configure one or more operational aspects for a client-registered function. In embodiments, client may request information associated a configuration and/or a state of the socket service 104. For example, the client may use a control plane API to query for the number of currently open sockets and for a list of the currently open sockets.

Figure 3:
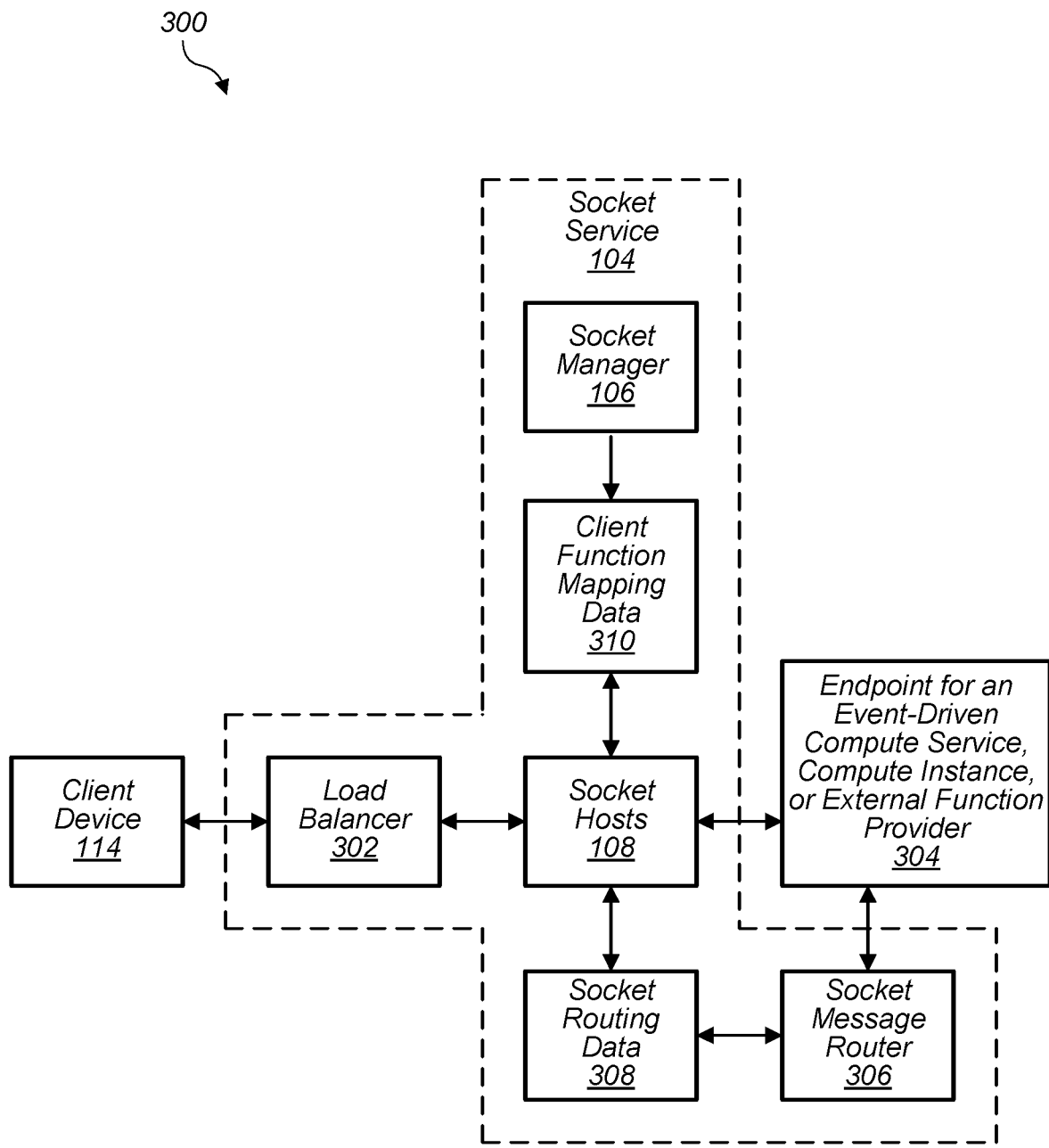
FIG. 3 illustrates a system and a process for managing secure sockets using a socket service of a provider network, according to some embodiments.

FIG. 3 illustrates a system 300 and a process for managing secure sockets using a socket service of a provider network, according to some embodiments. In the depicted embodiment, the socket service 104 of the provider network 102 includes one or more load balancers 302. In embodiments, the client device 114 forms a TCP connection to the load balancer, which in turn establishes a TCP session with a socket host 108 (or other host). The client device 114 may initiate a TLS mutually authenticated session with the socket host 108, which authorizes based on client-specific data (e.g., stored in account data 204 or other location). Subsequent to or in response to establishing the TLS session, the socket host 108 performs one or more actions, as described below (e.g., send data to an endpoint 304, invoke a client-registered function of the endpoint 304, etc.). In embodiments, the endpoint 304 may return a message to the socket, which may be sent to the client device 114.

In embodiments, the endpoint 304 may send data to the socket host 108 or retrieve data from the socket host (synchronously or asynchronously), as discussed below. In some instances, in order to send data from the endpoint 304 to a socket of the socket host 108, the endpoint 304 may send data along with a socket ID to the socket message router 306, which determines which socket host 108 to route the data to by referencing the socket routing data 308. Thus, the socket routing data 308 may include information that maps socket ID's to respective hosts that host a socket corresponding to the socket ID. In various embodiments, the socket routing data 308 and any other data discussed herein may be stored as a table or any other suitable data structure on any suitable hardware storage device.

In the depicted embodiment, the socket manager 106 updates the client function mapping data 310 when a client enters configuration information for one or more sockets using the socket manager 106. As discussed below, the socket host 108 references the client function mapping data 310 in order to determine how a given socket is configured. In the example embodiment, the endpoint 304 is not a component of the socket service 104. However, in some embodiments, the endpoint 304 or one or more other components may be included as components of the socket service 104.

Figure 4:
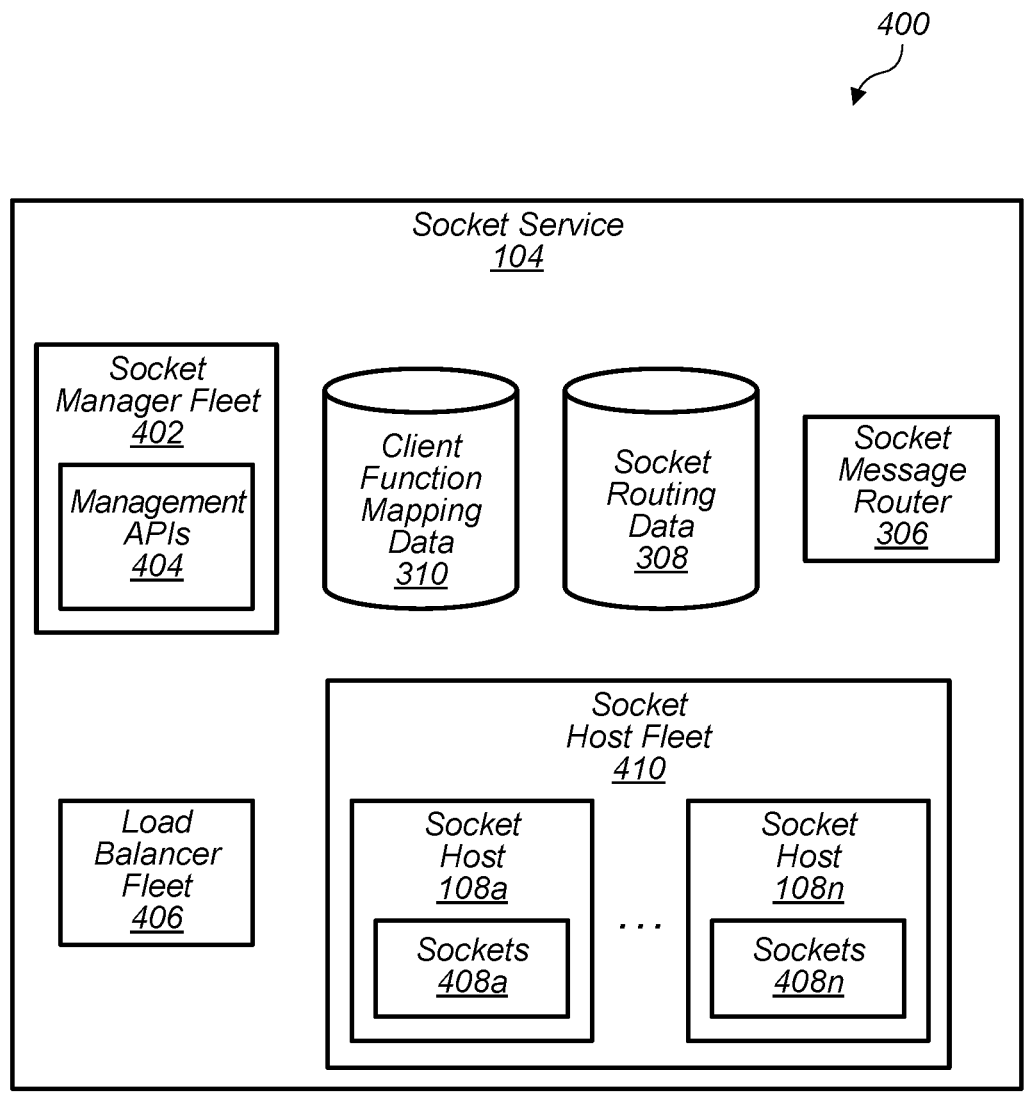
FIG. 4 is a block diagram illustrating example components that implement a secure socket service of a provider network, according to some embodiments.

FIG. 4 is a block diagram 400 illustrating example components that implement a secure socket service of a provider network, according to some embodiments. In the depicted embodiment, the socket service 104 includes a socket manager fleet 402 of servers that provide management APIs 404 to receive socket configuration data from client management devices 120 and to store the socket configuration data as client function mapping data 310 and/or other data of the socket service 104.

As discussed above for FIG. 3, the socket routing data 308 maps socket IDs to socket hosts. Thus, when an endpoint external to the socket service 104 needs to write and/or send data to a socket, the endpoint may send a message to the socket router 306 that includes a socket ID and the data. The socket router 306 may reference the socket routing data 308 to determine which socket host hosts the socket associated with the socket ID, and then the data can be routed to the socket host and to the socket. In some embodiments, the socket messaging router 306 may receive a request (e.g., a message or command) from an endpoint to read, fetch, or retrieve data from a particular socket. To do so, the request may include the socket ID of the socket to obtain the data from, and the socket message router may reference the socket routing data 308 to locate the socket host and corresponding socket to obtain the data and send the data to the requesting endpoint.

In the depicted embodiment, the socket service 104 includes a load balancer fleet 406 of servers that provider load balancing for incoming connection requests from client devices 114 and route the respective connection requests to one or more respective sockets 408 of respective socket hosts 108 of a socket fleet 408. In some embodiments, a load balancer may select a particular socket host 108 to host a socket 408 for a client device 114 based on one or more criteria. For example, if a client device 114*a* is to communicate with another client device 114*n* via peer sockets, then the load balancer may select the same socket host 108 to host respective sockets 408 for the client device 114*a* and the client device 114*n*. This may reduce any network delays associated with transmitting data between the two client devices.

FIG. 5 illustrates an example data structure 500 that stores client-defined function mappings, according to some embodiments. In the depicted embodiment, the client function mapping data 310 stores three different client-defined function mappings, wherein each client-defined function mapping specifies configuration parameters that are associated with a newly opened socket (including an endpoint for sending socket data to). Examples of endpoints are endpoints for an event-driven compute service, endpoints for an external function provider located external to the provider network, or endpoints for another service (e.g., a compute instance) located within the provider network. In embodiments, the client function mapping data 310 may store, for each client-defined function mapping, any suitable data for defining a custom protocol for a socket and any suitable data for defining how a socket operates.

In the example client function mapping data 310, a combination of client ID and a port number provides a unique identifier for a particular client-defined function mapping. Thus, when a client device connects to a particular port number, the socket service 104 may use the port number to determine which client-defined function mapping (e.g., custom protocol) to select from the function mapping data 310 and to associate with a new socket. Thus, for a particular client, a particular number of ports may be allocated for defining a particular number of client-defined function mappings. In other embodiments, an endpoint ID itself and/or other data may be used as the unique identifier for the client-defined function mapping. In some embodiments, the endpoint ID (or another entry for the particular client-defined function mapping) may be a network address of the endpoint or other data required for sending data to an endpoint.

However, in various embodiments, any suitable identifier may be used for a client device to uniquely identify a particular client-defined function mapping to be associated with a new socket. For example, the socket service 104 may instead use other identification information provided by a client device to identify a particular client-defined function mapping in client function mapping data 310 (or to store a new client-defined function mapping). As another example, when a user stores a new client-defined function mapping, the socket manager 106 may generate an ID for a particular client-defined function mapping (e.g., "123XYZ"). In that case, for a client device to use the particular client-defined function mapping after connecting to the socket service 104, the client device may provide the ID "123XYZ".

In the example embodiment, the first client-defined function mapping specifies endpoint ID SVC123 (e.g., identifying an event-driven compute service 118) corresponding to port number 9000. In some embodiments, the client-defined function mapping may also specify an ID for a particular client-registered function of the event-driven compute service 118. In the depicted embodiment, the second client-defined function mapping specifies endpoint ID EXT456 (e.g., identifying an external function provider 208) corresponding to port number 9001. The third client-defined function mapping specifies endpoint ID CPT789 (e.g., identifying a compute instance of the other compute services 202) corresponding to port number 9001.

In embodiments, one or more other configuration parameters may be stored for a particular client-defined function mapping. For example, for the first client-defined function mapping, the "Receive Criteria" parameters are specified as 128 KB and 30 seconds. Therefore, for a socket that is associated with the first client-defined function mapping, the socket may buffer 128 KB of data before sending the data to the endpoint or the socket may send data to the endpoint every 30 seconds regardless of how much data the socket has buffered. In the example embodiment, the "Idle Timeout" specifies a threshold amount of time that the socket may remain idle before the socket service 104 closes the socket. In various embodiments, any other suitable configuration parameters for defining a socket operation/protocol may be specified for a client-defined function mapping.

Various other configuration parameters may be stored for a particular client-defined function mapping. In some embodiments, when an endpoint 304 such as a client-registered function is invoked, the socket service 104 sends parameters for a buffer assigned to the socket, such as a start offset and a size of data. In some cases, an endpoint may invoke a read API, passing a socket ID and a sub-range of the buffer (or the entire buffer range) to read. The socket service 104 may then return the contents of the buffer for that sub-range. In some instances, if there is data in the buffer a the socket and the time since data was sent to the endpoint 304 exceeds a threshold time, the socket service 104 sends a socket ID of the socket and the data to the endpoint 304.

In some cases, the endpoint 304 may return an indication of an amount of data consumed (e.g., number of bytes), and the socket service 104 discards the amount of data from the beginning of the buffer. In some embodiments, the endpoint 304 may return a hint for the amount of data remaining in the current packet, and the socket service 104 may delay sending data to the endpoint 304 until that amount of data is available in the buffer. In embodiments, a minimum read threshold may be specify a minimum amount of data that must be present in the buffer before the data is sent to an endpoint 304. In some instances, a coalescing interval may specify how often data should be sent from the buffer to the endpoint, assuming data is present in the buffer.

In some embodiments, data returned from an endpoint may be stored in the buffer and sent back to the endpoint at a later time for further processing. In this way, output from the endpoint 304 may be persisted for future use. In embodiments, this data may be stored in a separate buffer for the socket. In other cases, the data may be stored in the same buffer, but is identified by metadata in the buffer or metadata at another location.

Figure 6A:
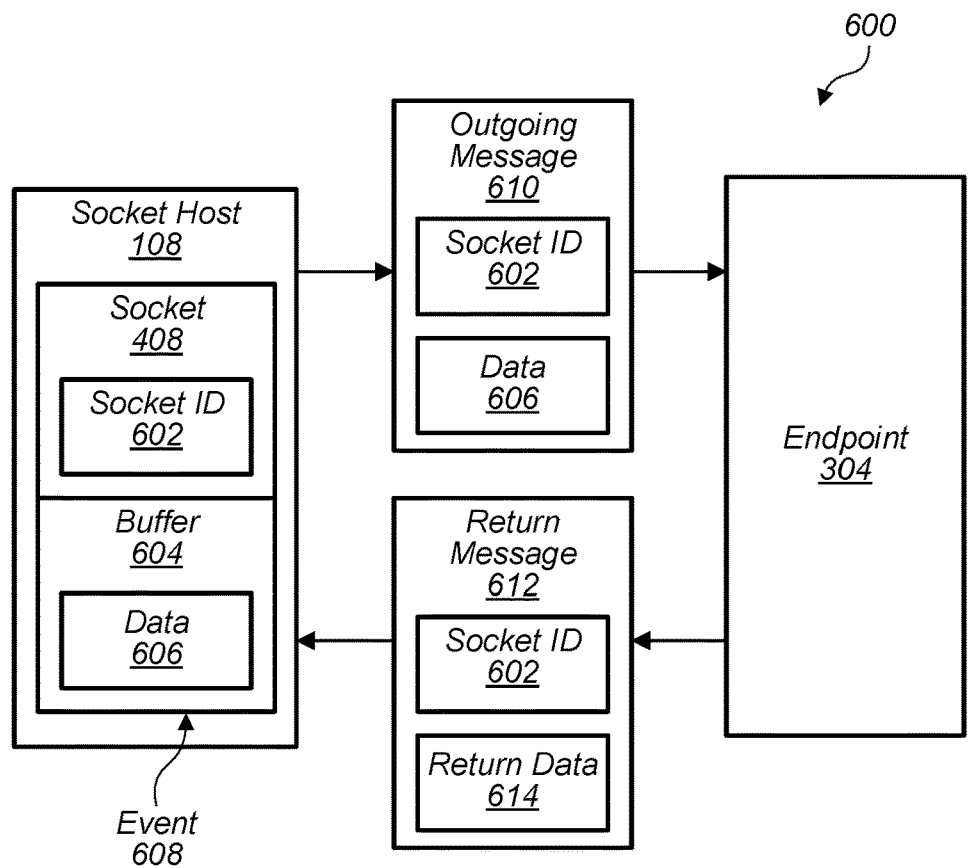
FIG. 6A illustrates a system and a process for interaction between a socket and an endpoint, according to some embodiments.

FIG. 6A illustrates a system 600 and a process for interaction between a socket and an endpoint, according to some embodiments. In the depicted embodiment, the socket host 108 includes a socket 408, wherein the socket host 108 assigns a socket ID 602 upon opening the socket 408 or in response to or subsequent to opening the socket 408. The socket host 108 also includes a buffer 604, wherein the socket host 108 assigns the buffer 604 upon opening the socket 408 or in response to or subsequent to opening the socket 408.

The buffer 604 may be used to store data 606 received at or by the socket 408. For example, the socket 408 may receive data from a client device 114, another socket, an endpoint 304, or another component of the socket service 104 or provider network 102, and then store at least some of the received data into the buffer 604. In embodiments, any other suitable data structure and/or hardware storage device may be used to store up to any amount of data 606 received at the socket 408 before at least a portion of the data 606 is sent to another destination (e.g., client device 114, another socket, an endpoint 304, or another component of the socket service 104).

In response to the socket host 108 and/or the socket service 104 determining that an event 608 has occurred, the socket 408 may send the socket ID 602 and/or at least a portion of the data 606 to an endpoint 304. In some instances, the socket 408 may send an indication to the endpoint 304 that the socket 408 has been opened, which may include the socket ID 602 and/or other data suitable to provide the indication. In the depicted embodiment, the socket host 108 may send to the endpoint 304 an outgoing message 610 that includes the socket ID 602 and the data 606.

In embodiments, the event 608 may be receiving the data 606 at the socket 408 and/or the buffer 604. In some embodiments, the event 608 may be one or more receive criteria being met for the data 606 received at the socket and/or received or stored at the buffer 604. As discussed above, the one or more event criteria may be specified in the client function mapping data 310 associated with the socket 408. Examples of the one or more event criteria are an amount of the data 606 received at the socket 408 and/or stored in the buffer 604 exceeding a pre-defined threshold, an amount of time since the data 606 was received from the client device exceeding a pre-defined threshold, or an amount of time since the data 606 was previously sent to the particular endpoint exceeding a threshold.

In some instances, in response to and/or subsequent to sending the data 606 to the endpoint 304, the socket 408 and/or a component of the socket service 104 (e.g., the socket message router 306) may receive a return message 612 from the endpoint 304 (e.g. a synchronous write back to the socket 408), wherein the return message 612 includes the socket ID 602 of the socket 408 that sent the outgoing message 610 and/or return data 614. In some cases, the socket message router 306 may route the return data 614 to the socket host 108 and the socket 408, as discussed above. The return data 614 may be received at the socket 408 and transmitted to the client device 114 associated with the socket 408 or any other suitable destination as described above. In embodiments, the return data 614 may include any processing results of the data 606 and/or any other results generated by a function of the endpoint 304.

Figure 6B:
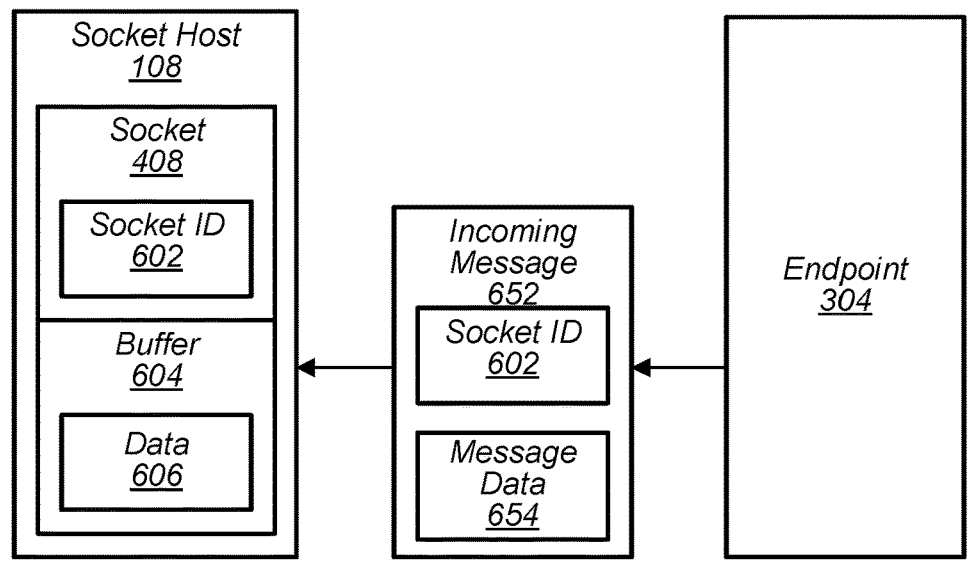
FIG. 6B illustrates a system and a process for receiving data at a socket via an asynchronous write application programming interface (API) call, according to some embodiments.

FIG. 6B illustrates a system 650 and a process for receiving data at a socket via an asynchronous write application programming interface (API) call, according to some embodiments. In the depicted embodiment, the endpoint 304 sends an incoming message 652 to the socket 408 and/or a component of the socket service 104 (e.g., the socket message router 306), wherein the incoming message 652 includes the socket ID 602 of the socket 408 and message data 654. The message data 654 may be received at the socket 408 and transmitted to the client device 114 associated with the socket 408 or any other suitable destination as described above.

In embodiments, the incoming message 652 is transmitted to the socket 408 and/or a component of the socket service 104 asynchronously. Thus, the endpoint 304 may send the incoming message 652 to the socket 110*a* in response to an event or process at the endpoint 304 (e.g., independent of any particular data received from or sent to the socket 110a). As discussed above, in embodiments, the endpoint 304 may asynchronously fetch or retrieve at least a portion of the data 606 (e.g., by indicating the socket ID 602).

In some embodiments, a client device 114 of a client management device 120 may send a request to the socket service 104 to open an outbound socket (e.g., via an API call) to an endpoint or hardware device external to the provider network 102. The request may indicate a destination network address and/or a destination port. Upon success in establishing a connection or failure to establish a connection, the socket service 104 may invoke a client-registered function or other endpoint. In some cases, this may provide a convenient way for a client to perform serverless command and control of network resources that communicate via obscure binary protocols.

Figure 7:
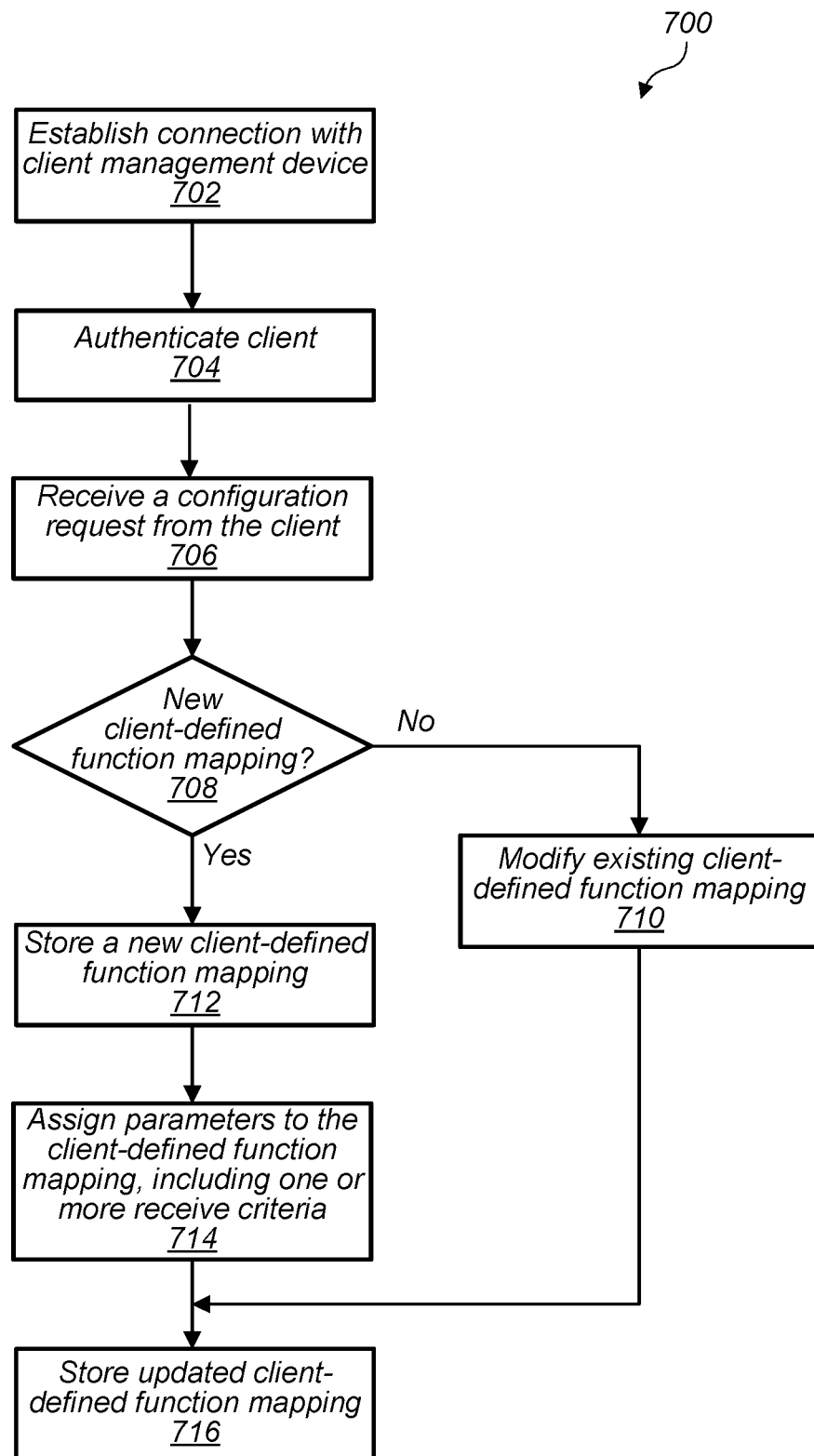
FIG. 7 is a flow diagram of a process for updating function mapping data for a client, according to some embodiments.

FIG. 7 is a flow diagram of a process 700 for updating function mapping data for a client, according to some embodiments. One or more portions of the illustrated process may be performed via one or more components of the socket service 104 (e.g., a host server for a socket manager 106 or a socket host 108) and/or the provider network 102.

At block 702, a client management device 120 establishes a connection with the socket manager 106. At block 704, the socket manager 106 authenticates the client and/or the client management device 120 (e.g., based on user account data 204). At block 706, the management device 120 receives a configuration request from the client. At block 708, the management device 120 determines whether the request is to establish a new client-defined function mapping or to modify an existing client-defined function mapping.

If the request is to modify an existing client-defined function mapping, then at block 710, the socket manager 106 may select a client-defined function mapping based on a client-defined function mapping ID provided in the request and modify the client-defined function mapping based on one or more parameters specifies in the request. Otherwise, at block 712, the socket manager 106 stores a new client-defined function mapping, wherein the socket manager 106 associates an ID for the client-defined function mapping with an endpoint (or an identifier for the endpoint).

At block 714, the socket manager 106 assigns parameters to the client-defined function mapping. For example, the parameters may include one or more receive criteria, as discussed above. At block 716, the socket manager 106 stores the updated or newly entered parameters for the client-defined function mapping.

Figure 8:
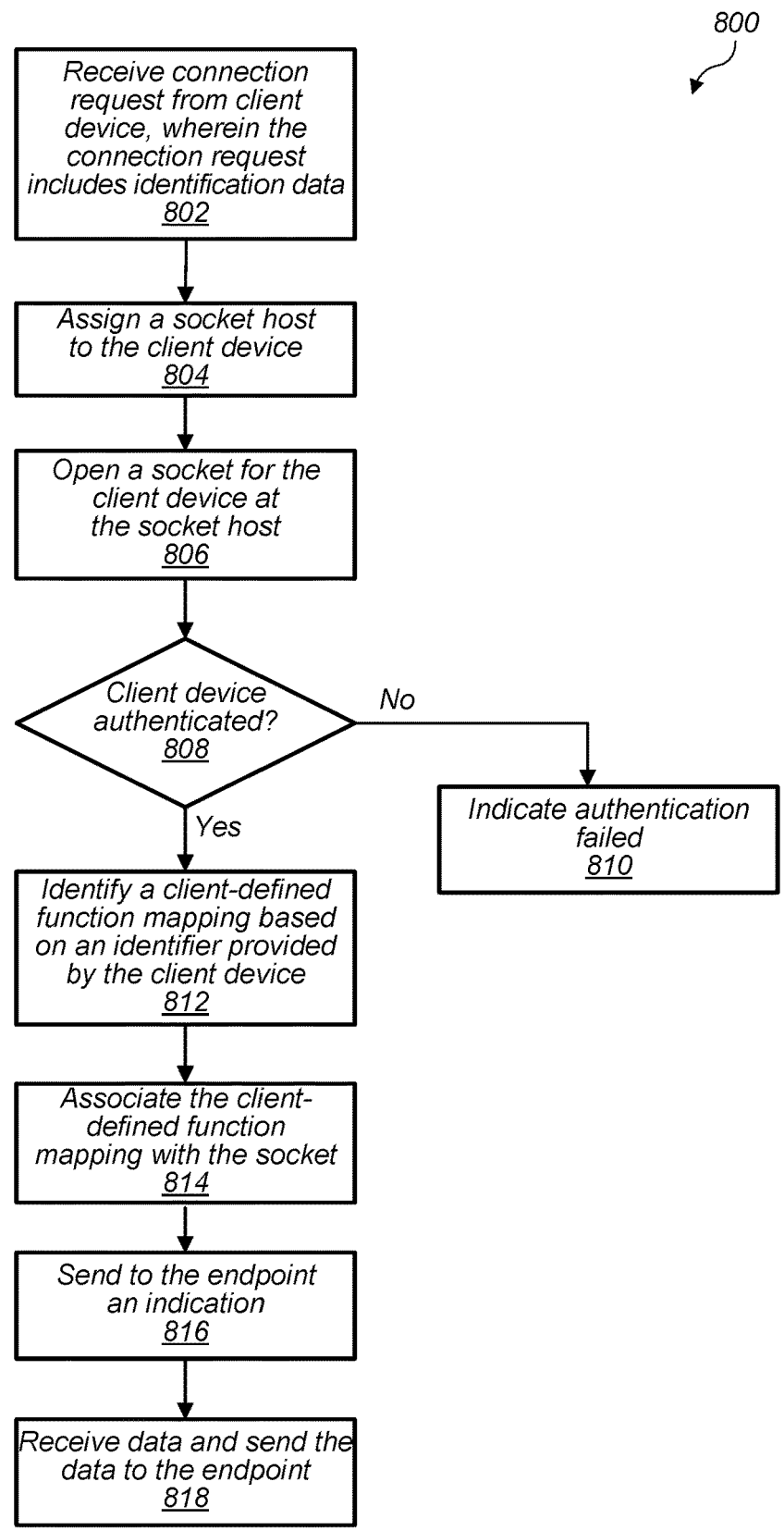
FIG. 8 is a flow diagram of a process for opening a socket for a client device, according to some embodiments.

FIG. 8 is a flow diagram of a process 800 for opening a socket for a client device, according to some embodiments. One or more portions of the illustrated process may be performed via one or more components of the socket service 104 (e.g., a socket host 108) and/or the provider network 102.

At block 802, the socket service 104 receives a connection request from a client device 114, wherein the connection request includes identification data (e.g., authentication credentials for the client and/or the client device 114, device identifier and/or identifier for a client-defined function mapping). At block 804, the socket service 104 assigns a socket host 108 to the client device 114 and/or the connection for the client device 114. At block 806, the socket service 104 opens a socket at the assigned socket host 108.

At block 808, the socket service 104 determines whether the client device is authenticated. For example, the socket service 104 may authenticate at least some of the identification data against client credentials for the client stored in the account data 204. In some embodiments, a security certificate is validated by the identity data plane (e.g., based on account data 204), and the socket service 104 ties or associates the client device to a particular user account. If the authentication fails, the process proceeds to block 810. Otherwise, the process proceeds to block 812.

At block 812, the socket service 104 identifies one of the client-defined function mappings stored in the client function mapping data 310 according to an identifier received from the client device 114, wherein the client-defined function mapping identifies a particular endpoint 304. At block 814, the socket service 104 associates the identified client-defined function mapping with the socket on the socket host 108. The socket may then listen for data. At block 816, in response to data received at the socket from the client device, the socket service 104 sends the data to the particular endpoint 304 identified in the client-defined function mapping associated with the socket. As discussed, the socket may send the data in accordance with one or more receive criteria specified in the client-defined function mapping for the socket.

Figure 9:
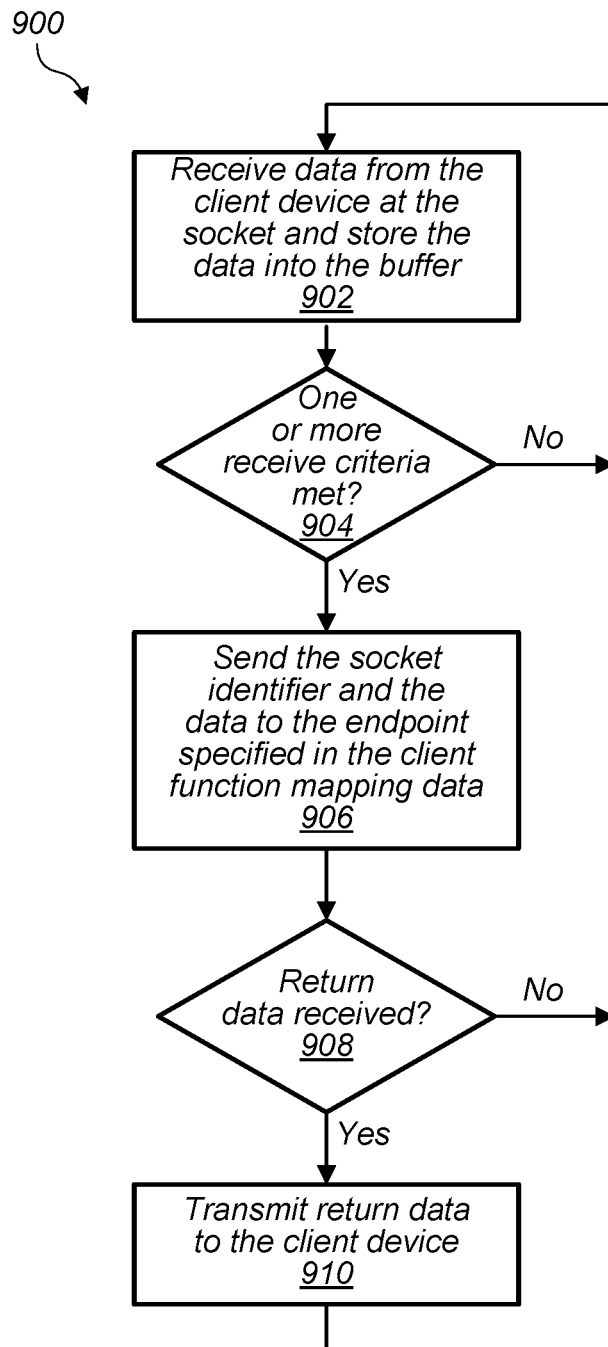
FIG. 9 is a flow diagram of a process for processing data at a socket for a client device, according to some embodiments.

FIG. 9 is a flow diagram of a process 900 for processing data at a socket for a client device, according to some embodiments. One or more portions of the illustrated process may be performed via one or more components of the socket service 104 (e.g., a socket host 108) and/or the provider network 102.

At block 902, a socket 408 receives data from a client device 114 and stores the data into a buffer. At block 904, the socket service 104 determines whether one or more receive criteria for the received data is met. If not, the process returns to block 902. Otherwise, at block 906, the socket service 104 sends a socket identifier for the socket 408 and the data to an endpoint 304 specified in the client-defined function mapping associated with the socket 408.

At block 908, the socket service 104 determines whether return data was received. If not, the process returns to block 902. Otherwise, at block 910, the socket service 104 transmits the return data to the client device 114. The process then returns to block 902.

Figures 10, 11:
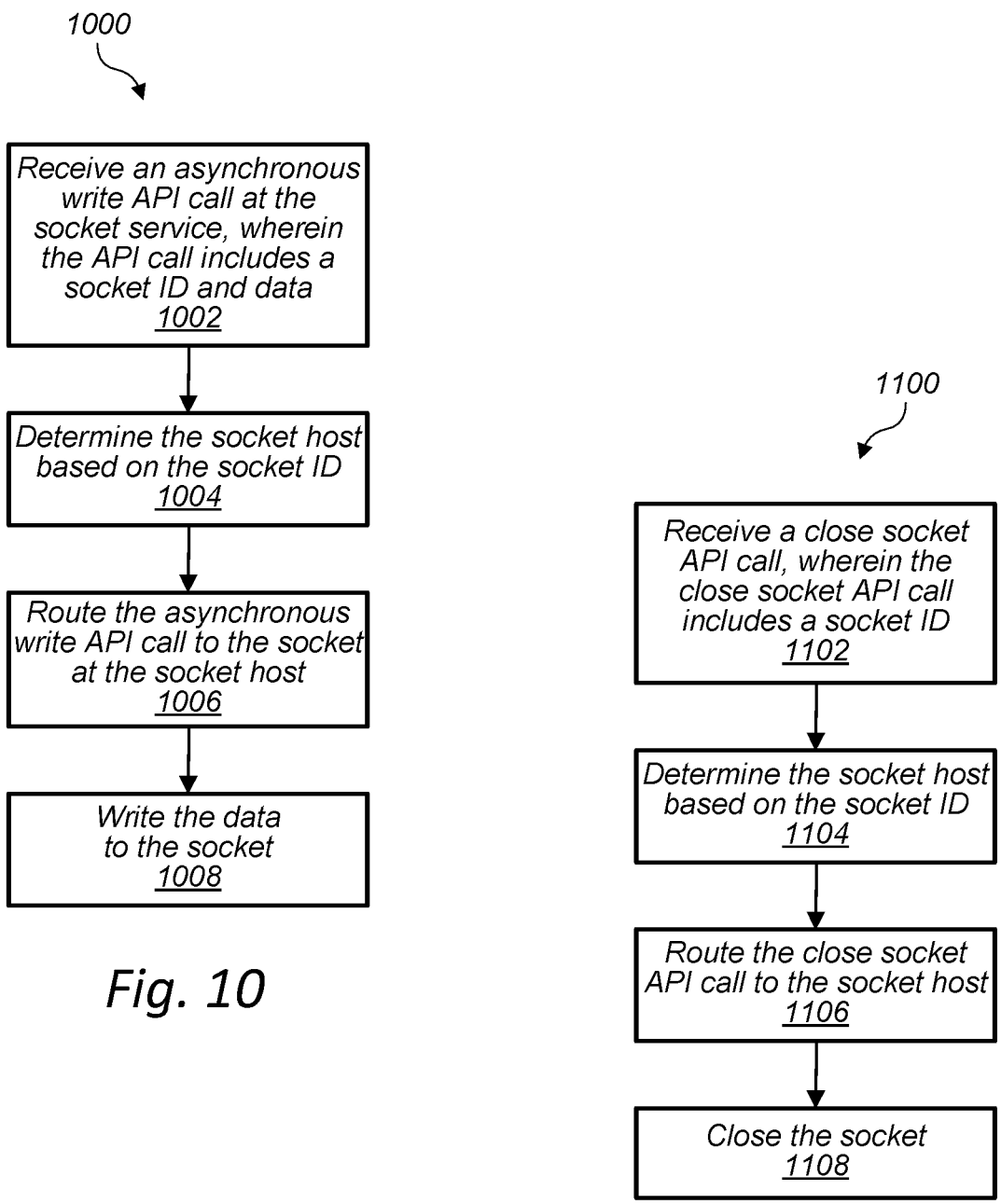
FIG. 10 is a flow diagram of a process for routing data to a socket via an asynchronous API call, according to some embodiments.
FIG. 11 is a flow diagram of a process for closing a socket via an API call, according to some embodiments.

FIG. 10 is a flow diagram of a process 1000 for routing data to a socket via an asynchronous API call, according to some embodiments. One or more portions of the illustrated process may be performed via one or more components of the socket service 104 and/or the provider network 102.

At block 1002, the socket service 104 receives data asynchronously from an endpoint 304. For example, the socket service 104 may receive a write API call (e.g., an incoming message 652), wherein the API call includes a socket ID and data. At block 1004, the socket service 104 may determine the socket host 108 that is hosting the socket associated based on the socket ID (e.g., using a socket message router 306 and socket routing data 308). At block 1006, the socket service 104 routes the API call to the socket at the socket host 108. At block 1008, the socket service 104 writes the data to the socket. The data may then be sent to a client device 114. In some embodiments, in response to writing the data to the socket and/or sending the data to the client device 114, the socket service 104 sends to an endpoint in indication that the data was written to the socket and/or sent to the client device (e.g., sending the indication to a client-registered function or other endpoint associated with a client-defined function mapping for the socket.)

FIG. 11 is a flow diagram of a process 1100 for closing a socket via an API call, according to some embodiments. One or more portions of the illustrated process may be performed via one or more components of the socket service 104 (e.g., a socket host 108) and/or the provider network 102.

At block 1002, the socket service 104 receives a close socket API call, wherein the call includes a socket ID of a socket to be closed. At block 1004, the socket service 104 determines the socket host 108 that is hosting the socket associated based on the socket ID (e.g., using a socket message router 306 and socket routing data 308). At block 1106, the socket service 104 routes the close socket call to the socket host 108 and to the socket. At block 1008, the socket is closed in response to receiving the API call. In some embodiments, in response to closing the socket, the socket service 104 sends to an endpoint in indication that the socket was closed (e.g., sending the indication to a client-registered function or other endpoint associated with a client-defined function mapping for the socket.)

Figure 12A:
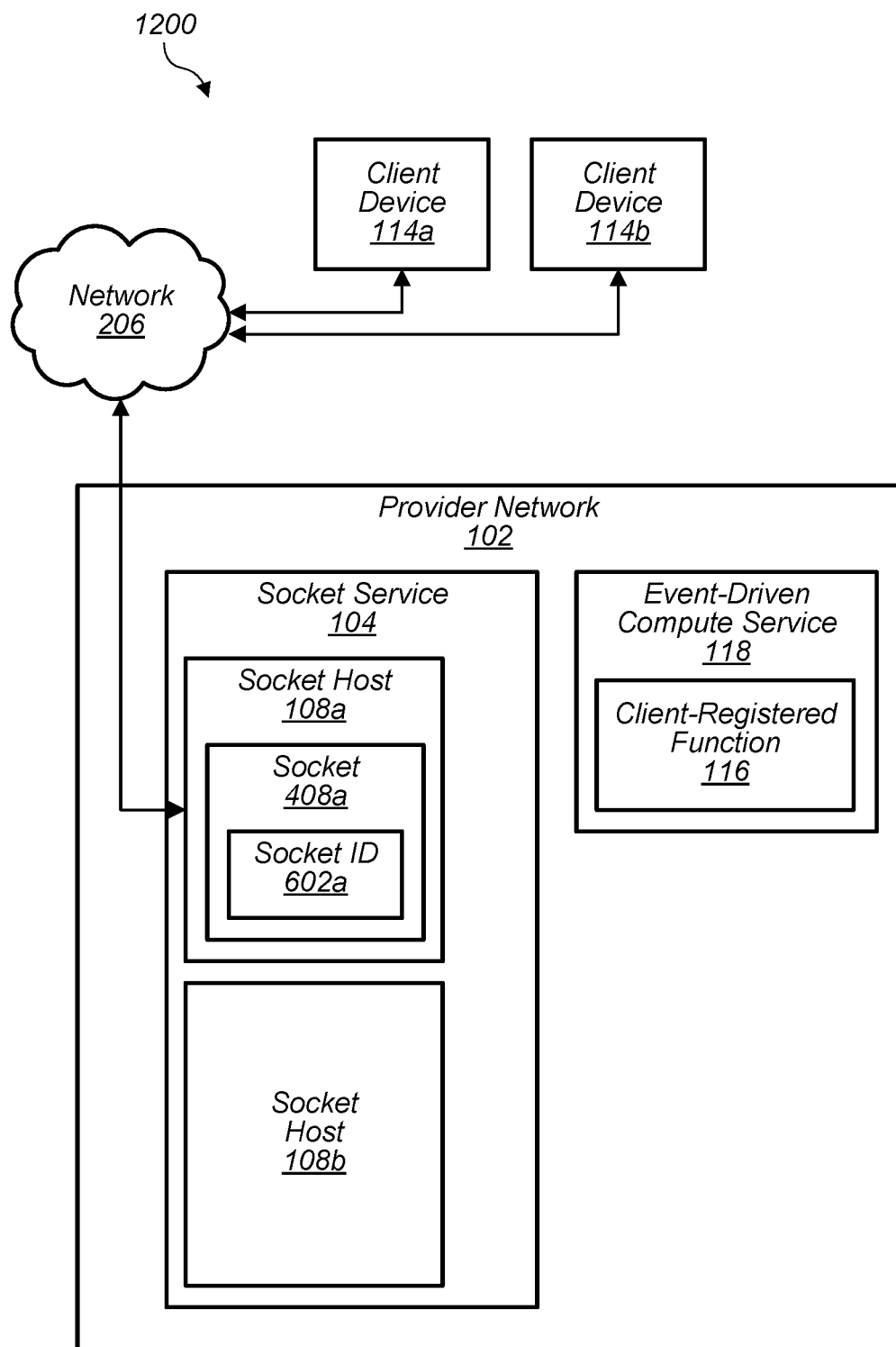
FIG. 12A illustrates a system and a process for linking sockets for two client devices, according to some embodiments.

FIG. 12A illustrates a system 1200 and a process for linking sockets for two client devices, according to some embodiments. In the depicted embodiment, a socket 408*a* at the socket host 108*a* has been opened for a client device 114*a*. As shown, the socket service 104 includes the socket host 108*a* and the socket host 108*b*.

The provider network includes an event-driven compute service 118, wherein the event-driven compute service 118 includes at least one client-registered function 116. As shown, a client device 114*b* is connected to the network 206. A client may have a need to communicatively link the client device 114*a* to the client device 114*b*.

Figure 12B:
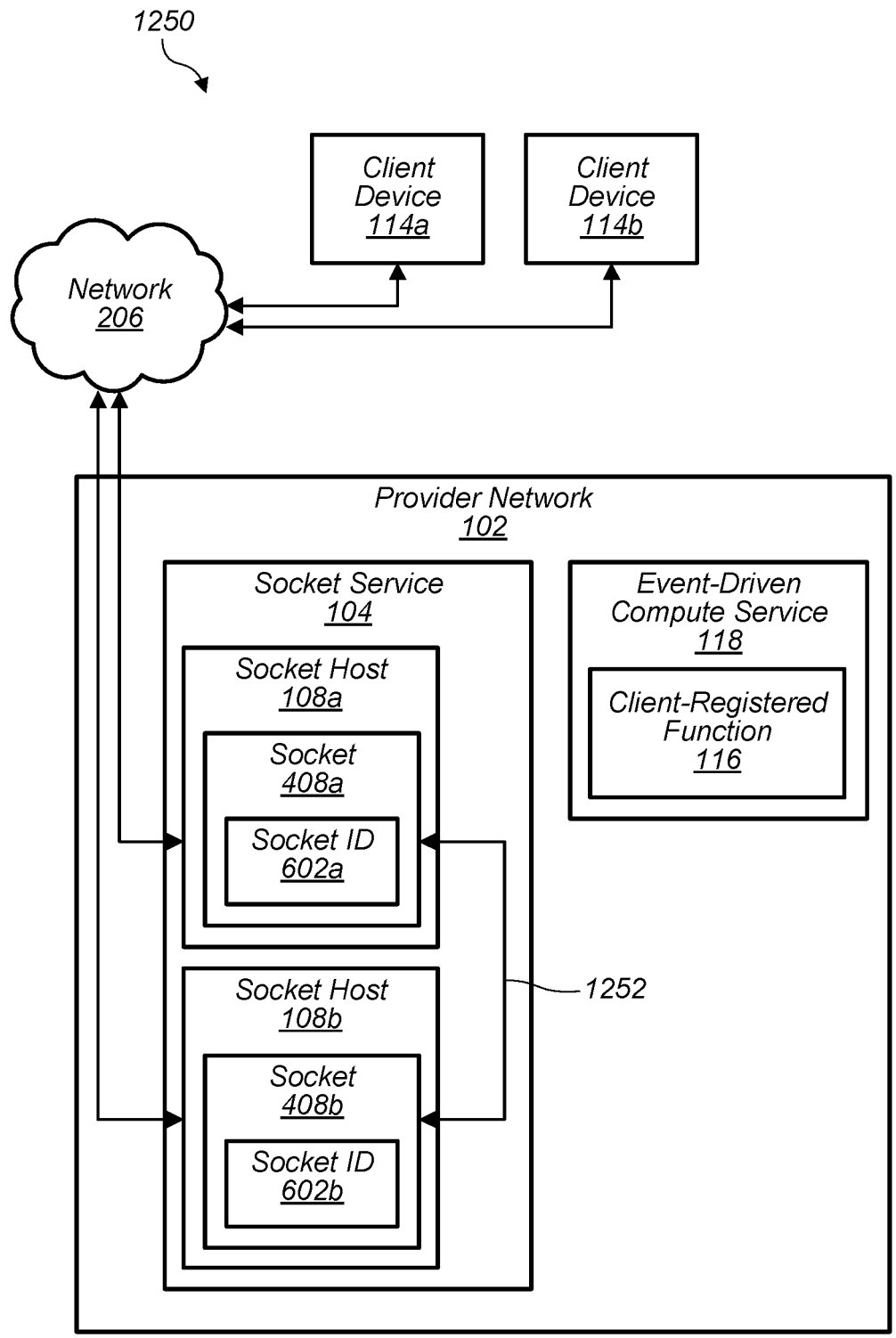
FIG. 12B illustrates a system and a process for linking sockets for two client devices, according to some embodiments.

FIG. 12B illustrates a system 1250 and a process for linking sockets for two client devices, according to some embodiments. In the depicted embodiment, the socket 408*b* is opened at the socket host 108*a* for the client device 114*b*. The socket 408*b* may be opened using the process discussed above, or similar process, for opening a socket. The socket 408*b* may be associated with a client-defined function mapping that specifies the client-registered function 116 of the event-driven compute service 118 as an endpoint 304. In other embodiments, the socket 408*a* may be associated with a client-defined function mapping that specifies a different endpoint, as discussed above.

In embodiments, the socket 408*b* sends an identifier associated with the client device 114*b* to the client-registered function 116. The socket 408*b* may then receive from the endpoint the socket ID 602*a*. The socket service 104 may then link the socket 408*b* with the socket 408*a*. After linking the sockets, data received at the socket 408*a* from the client device 114*a* may be forwarded to the socket 408*b* for transmission to the client device 114*b* and/or data received at the socket 408*b* from the client device 114*b* may be forwarded to the socket 408*a* for transmission to the client device 114*a*. Thus, the client device 114*a* and the client device 114*b* may be communicatively and/or virtually connected via a link 1252 between the respective sockets. As discussed above, an endpoint other than the client-registered function 116 may be used.

Figure 13A:
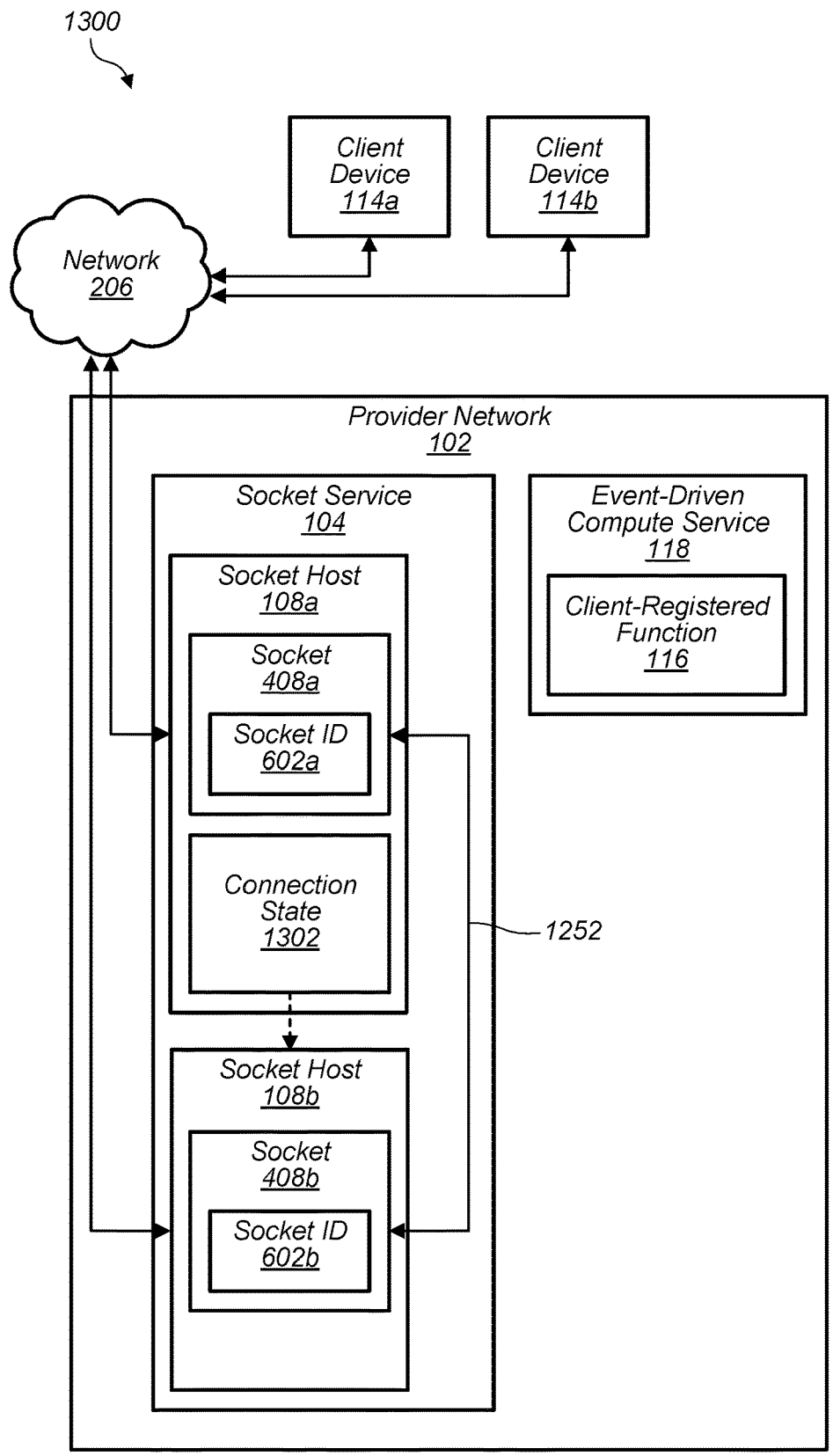
FIG. 13A illustrates a system and a process for migrating a connection for a client device to a socket host hosting another connection for another client device and linking sockets for the client device and the other client device, according to some embodiments.

FIG. 13A illustrates a system and a process for migrating a connection for a client device to a socket host hosting another connection for another client device and linking sockets for the client device and the other client device, according to some embodiments.

In the depicted embodiment, the socket service 104 may determine that one or more migration criteria are met to migrate a connection for the client device 114*a* from the socket host 108*a* to the socket host 108*b*. The migration criteria may include a load on the socket host 108*a* exceeding a pre-defined threshold, a load on the other socket host 108*b* being below a pre-defined threshold, a communication delay between the socket host 108*a* and the other socket host 108*b* exceeding a pre-defined threshold, the other socket host 108*b* satisfying a host exclusivity requirement for the client or the client device 114*a*, and/or the socket host 108*b* not satisfying a host exclusivity requirement for the client or the client device 114*a*. For example, a client may desire that all connections hosted on a particular socket host be hosted exclusively for the client (e.g., no other clients should be connected to the particular socket host). Any other suitable migration criteria may be used. The connection state 1302 for the connection for the client device 114*a* at the socket host 108*a* may be maintained at the socket host 108*a*.

Figure 13B:
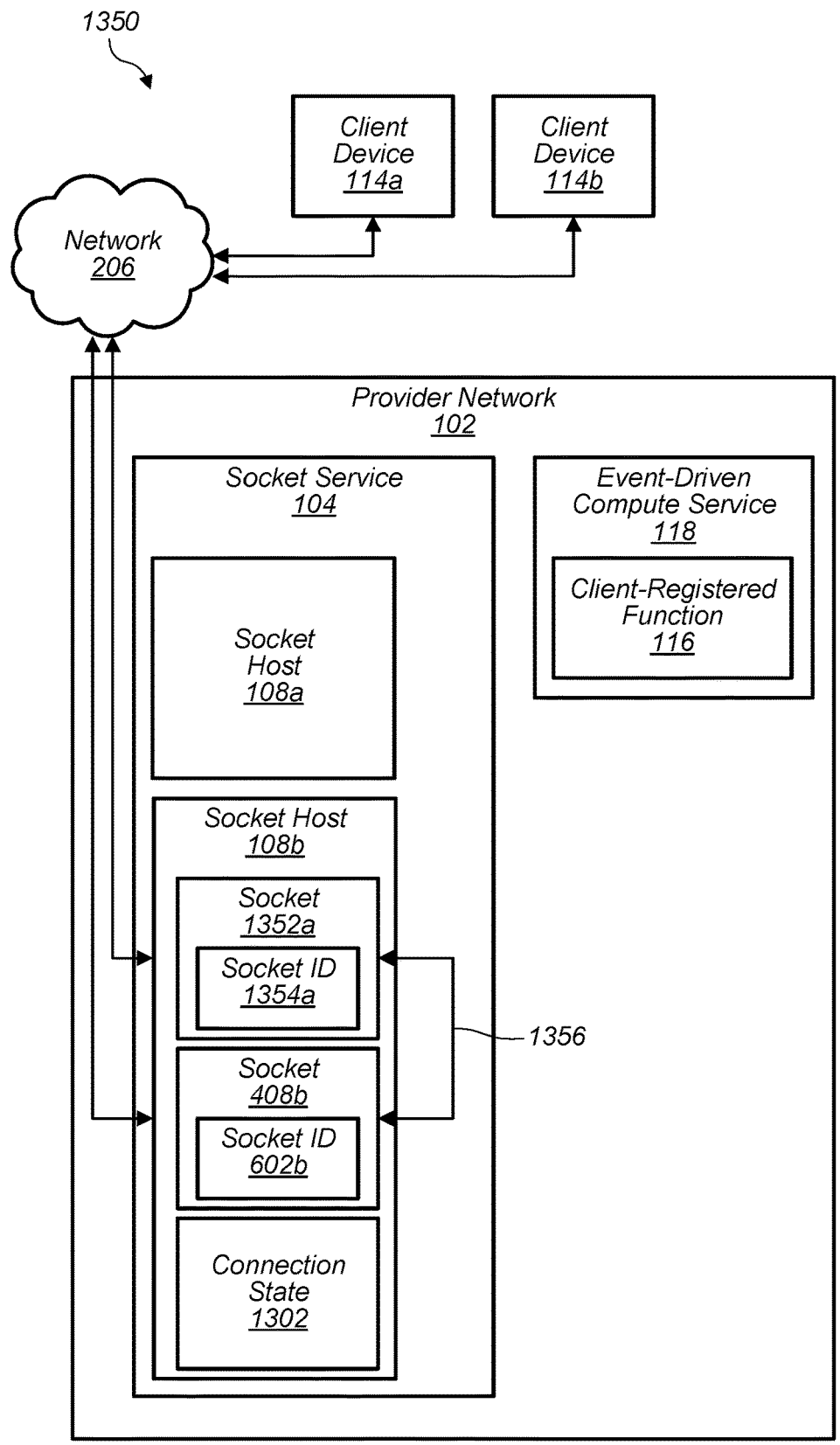
FIG. 13B illustrates a system and a process for migrating a connection for a client device to a socket host hosting another connection for another client device and linking sockets for the client device and the other client device, according to some embodiments.

FIG. 13B illustrates a system and a process for migrating a connection for a client device to a socket host hosting another connection for another client device and linking sockets for the client device and the other client device, according to some embodiments.

In the example embodiment, in response to determining that the migration criteria are met, the connection for the client device 114*a* is migrated from the socket host 108*a* to the socket host 108*b*. To migrate the connection, the socket service 104 may obtain the connection state 1302 for the connection and send the connection state 1302 for the connection from the socket host 108*a* to the socket host 108*b*. The connection state 1302 may include TCP session data and any other connection data or other data necessary to establish a new connection for the client device 114*a* on the other socket host 108*b*.

In embodiments, the socket service 104 may open, at the socket host 108*b*, a new socket and associate and/or apply a client-defined function mapping to the new socket 1352*a*. The client-defined function mapping associated with the new socket 1352*a* may be the same or different than client-defined function mapping that was associated with the socket 408*a*. The socket service 104 may then link the new socket 1352*a* and the socket 408*b*.

The socket service 104 may then apply the connection state 1302 for the connection at the socket host 108*b*, wherein data for the connection for the client device 114*a* is routed to the socket host 108*b* via the new socket 1352*a*. In embodiments, the new socket is assigned a socket ID 1354*a*. Then, the client device 114*a* and the client device 114*b* may be communicatively and/or virtually connected via a link 1356 between the new socket 1352*a* and the socket 408*b*. As discussed above, the process of linking may be performed using the client-registered function 1326 or an endpoint other than the client-registered function 116 may be used. In some embodiments, the socket service 104 may perform the linking without the need to use an endpoint, since the socket service 104 may already know that the new socket 1352*a* and the socket 408*b* are to be linked based on the previous link 1252 between the sockets.

Figure 14A:
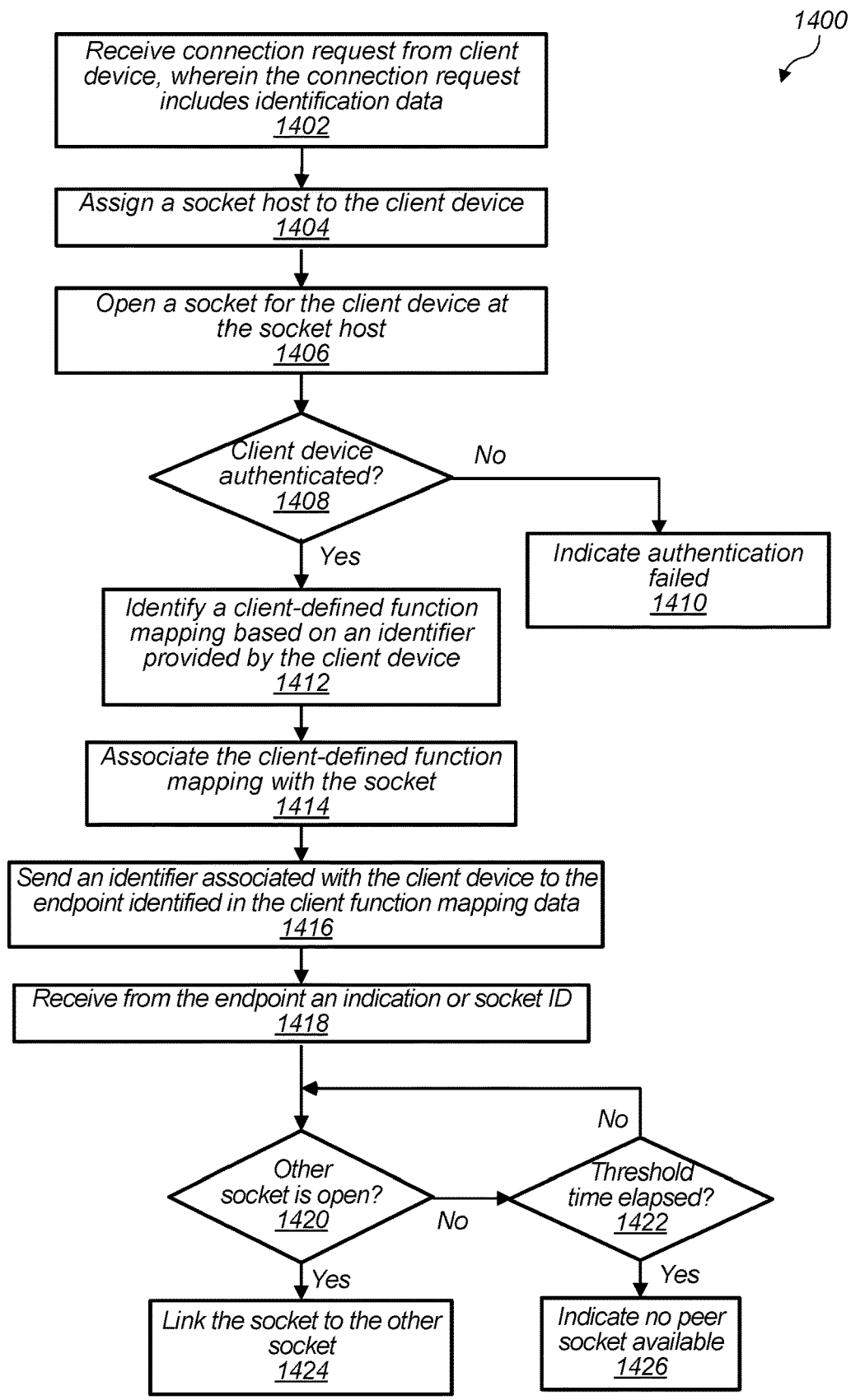
FIG. 14A is a flow diagram of a process for opening a socket and linking the socket to another socket, according to some embodiments.

FIG. 14A is a flow diagram of a process 1400 for opening a socket and linking the socket to another socket, according to some embodiments. One or more portions of the illustrated process may be performed via one or more components of the socket service 104 (e.g., a socket host 108) and/or the provider network 102.

At block 1402, the socket service 104 receives a connection request from a client device 114, wherein the connection request includes identification data (e.g., authentication credentials for the client and/or the client device 114, device identifier and/or identifier for a client-defined function mapping). At block 1404, the socket service 104 assigns a socket host 108 to the client device 114 and/or the connection for the client device 114. At block 1406, the socket service 104 opens a socket at the assigned socket host 108. At block 1408, the socket service 104 determines whether the client device is authenticated. For example, the socket service 104 may authenticate at least some of the identification data against client credentials for the client stored in the account data 204. If the authentication fails, the process proceeds to block 810. Otherwise, the process proceeds to block 812. At block 1412, the socket service 104 identifies one of the client-defined function mappings stored in the client function mapping data 310 according to an identifier received from the client device 114, wherein the client-defined function mapping identifies a particular endpoint 304.

At block 1414, the socket service 104 associates the identified client-defined function mapping with the socket on the socket host 108. At block 1416, the socket may then send an identifier associated with the client device to the endpoint specified in the client-defined function mapping. At block 1418, the socket service 104 may receive from the endpoint an indication or a socket ID. For example, the socket service 104 may receive from the endpoint an indication that the socket is to be linked with another socket that has not yet been opened or that is currently unavailable to link to. In embodiments, the socket service 104 may receive from the endpoint a socket ID of another socket to be linked to.

At block 1420, the socket service 104 determines whether the other socket is open and available, wherein the other socket is to be linked to the socket. If not, (e.g., the above indication is received and/or no other socket ID is received), then the process may proceed to block 1422, wherein the socket service 104 may determine whether a threshold amount of time has elapsed (e.g., since the socket service 104 received the indication that the other socket is not yet opened or is unavailable). In some embodiments, before determining whether the threshold amount of time has elapsed, the socket service 104 waits for a pre-determined period of time (e.g., 30 seconds) in order to avoid checking for the peer socket too often.

If the socket service 104 determines that other socket is open and available, then at block 1424, the socket service 104 links the socket to the other socket. Subsequent to linking the sockets, data received at the socket from the client device is forwarded to the other socket for transmission to the other client device and/or data received at the other socket from the other client device is forwarded to the socket for transmission to the client device. At block 1422, if the socket service 104 determines that the threshold time has elapsed (e.g., since the socket service 104 received the indication that the other socket is not yet opened or is unavailable), then at block 1426, the socket service 104 indicates (e.g., to the client device 114, the endpoint 304, or other endpoint) that no peer socket is available to link to the socket.

Figure 14B:
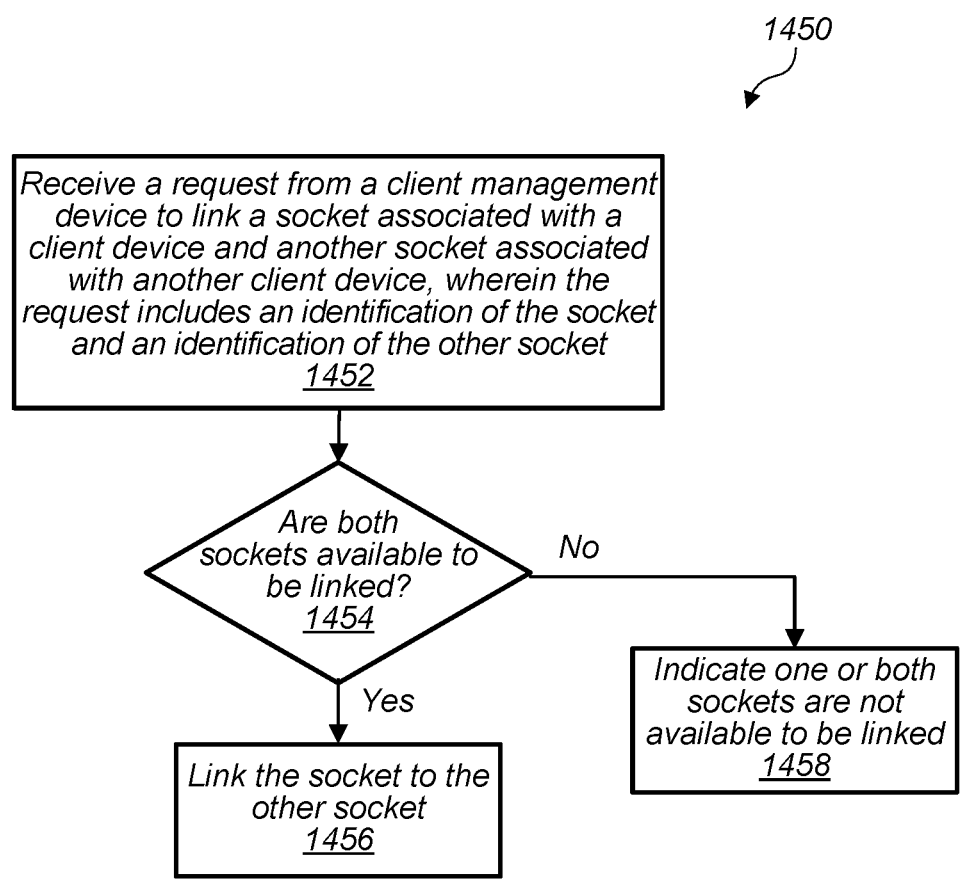
FIG. 14B is a flow diagram of a process for receiving a request and linking a socket to another socket, according to some embodiments.

FIG. 14B is a flow diagram of a process 1450 for receiving a request and linking a socket to another socket, according to some embodiments. One or more portions of the illustrated process may be performed via one or more components of the socket service 104 (e.g., a socket host 108) and/or the provider network 102.

At block 1452, the socket service 104 receives a request from a client management device to link a socket associated with a client device and another socket associated with another client device, wherein the request includes an identification of the socket and an identification of the other socket. At block 1454, the socket service 104 determines whether both of the identified sockets are available to be linked (e.g., both sockets are open and available for linking together). If so, then at block 1456, the socket service 104 links the sockets together. If not, then at block 1458, the socket service 104 indicates that one or both of the sockets are not available to be linked.

In some embodiments, the socket service 104 may indicate a status for each of the sockets (e.g., not yet opened, opened but not available). In some cases, one or both sockets may not be available because one or both sockets are linked to other respective sockets or are not configured to communicate with each other.

Figure 15:
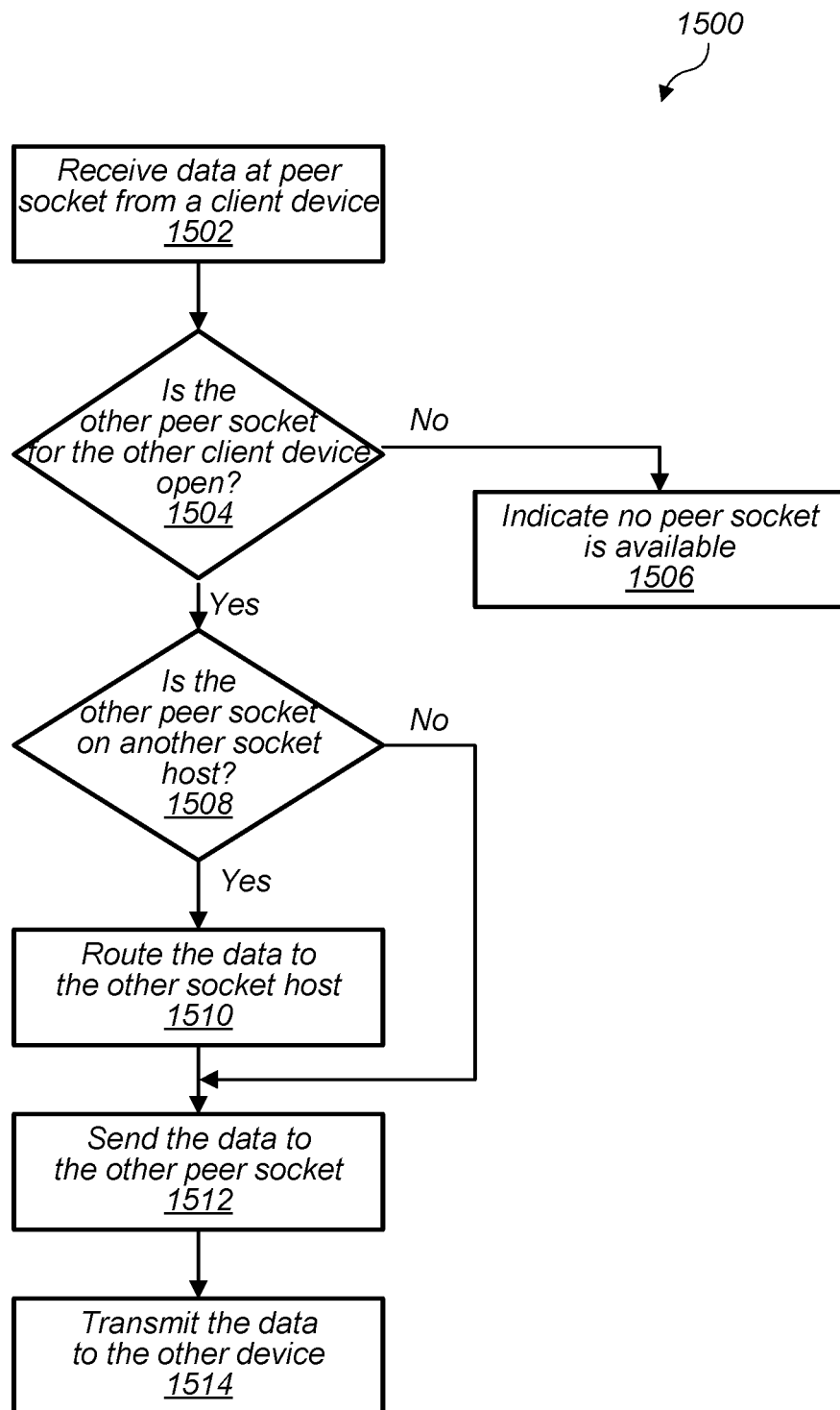
FIG. 15 is a flow diagram of a process for routing data between client devices using peer sockets, according to some embodiments.

FIG. 15 is a flow diagram of a process 1500 for routing data between client devices using peer sockets, according to some embodiments. One or more portions of the illustrated process may be performed via one or more components of the socket service 104 (e.g., a socket host 108) and/or the provider network 102.

At block 1502, a peer socket receives data from a client device 114a. At block 1504, the socket service 104 determines whether the other peer socket for the other client device 114b is open. If not, the process proceeds to block 1506, where the socket service 104 indicates that no peer socket is available. Otherwise, the process proceeds to block 1508.

At block 1508, the socket service 104 determines whether the other peer socket is on another socket host other than the socket host hosting the peer socket. If so, at step 1510, the data is routed from the socket hosting the peer socket to the other socket host hosting the other peer socket. Otherwise, the data is sent to the other peer socket on the same socket host 108 at block 1512. At block 1514, the socket service 104 transmits the data from the other peer socket to the other device.

In some embodiments, prior to transmitting the data from the other peer socket to the other client device, the socket service 104 modifies the data. The data may be modified based on one or more requirements of the other client device for receiving data. For example, the requirements for the other client device may specify a different format for the data than the format of the data received from the client device. The data may be re-formatted by the socket service (e.g., by the socket host and/or the other socket host) at any point after it is received (e.g., before being sent to the socket, before forwarding to the other socket, after sending from the other socket). In some embodiments, some or all of the data may be sent from the socket or the other socket to an endpoint 304, where the data is reformatted. The data may then be sent back to the socket or forwarded (or sent back) to the other socket.

Figure 16:
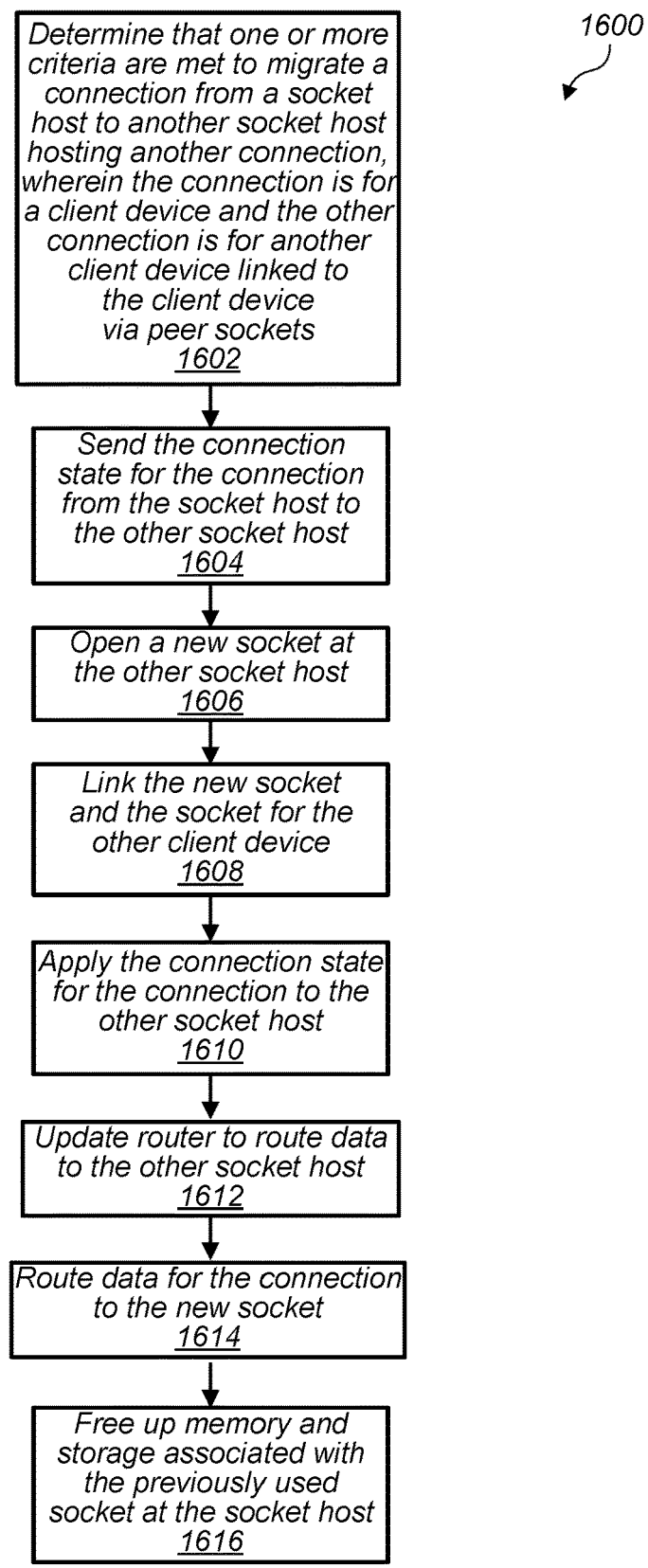
FIG. 16 is a flow diagram of a process for migrating a connection for a client device to a socket host hosting another connection for another client device and linking sockets for the client device and the other client device, according to some embodiments.

FIG. 16 is a flow diagram of a process 1600 for migrating a connection for a client device to a socket host hosting another connection for another client device and linking sockets for the client device and the other client device, according to some embodiments. One or more portions of the illustrated process may be performed via one or more components of the socket service 104 (e.g., a socket host 108) and/or the provider network 102.

At block 1602, the socket service 104 determines that one or more criteria are met to migrate a connection from a socket host to another socket host hosting another connection, wherein the connection is for a client device and the other connection is for another client device linked to the client device via peer sockets. At block 1604, the socket service 104 sends the connection state for the connection from the socket host to the other socket host.

At block 1606, the socket service 104 opens a new socket at the other socket host. At block 1608, the socket service 104 links the new socket and the socket for the other client device. At block 1610, the socket service 104 applies the connection state for the connection to the other socket host.

At block 1612, the socket service updates a router (e.g., one or more load balancers of the load balancer fleet 406) to route data to the other socket host. At block 1614, the updated router routes data for the connection to the new socket at the other socket host. At block 1616, the socket service 104 frees up memory and storage associated with the previously used socket at the socket host. In embodiments, the connection for the client device may be migrated to the other socket host without the client device being aware of the connection migration.

Figure 17:
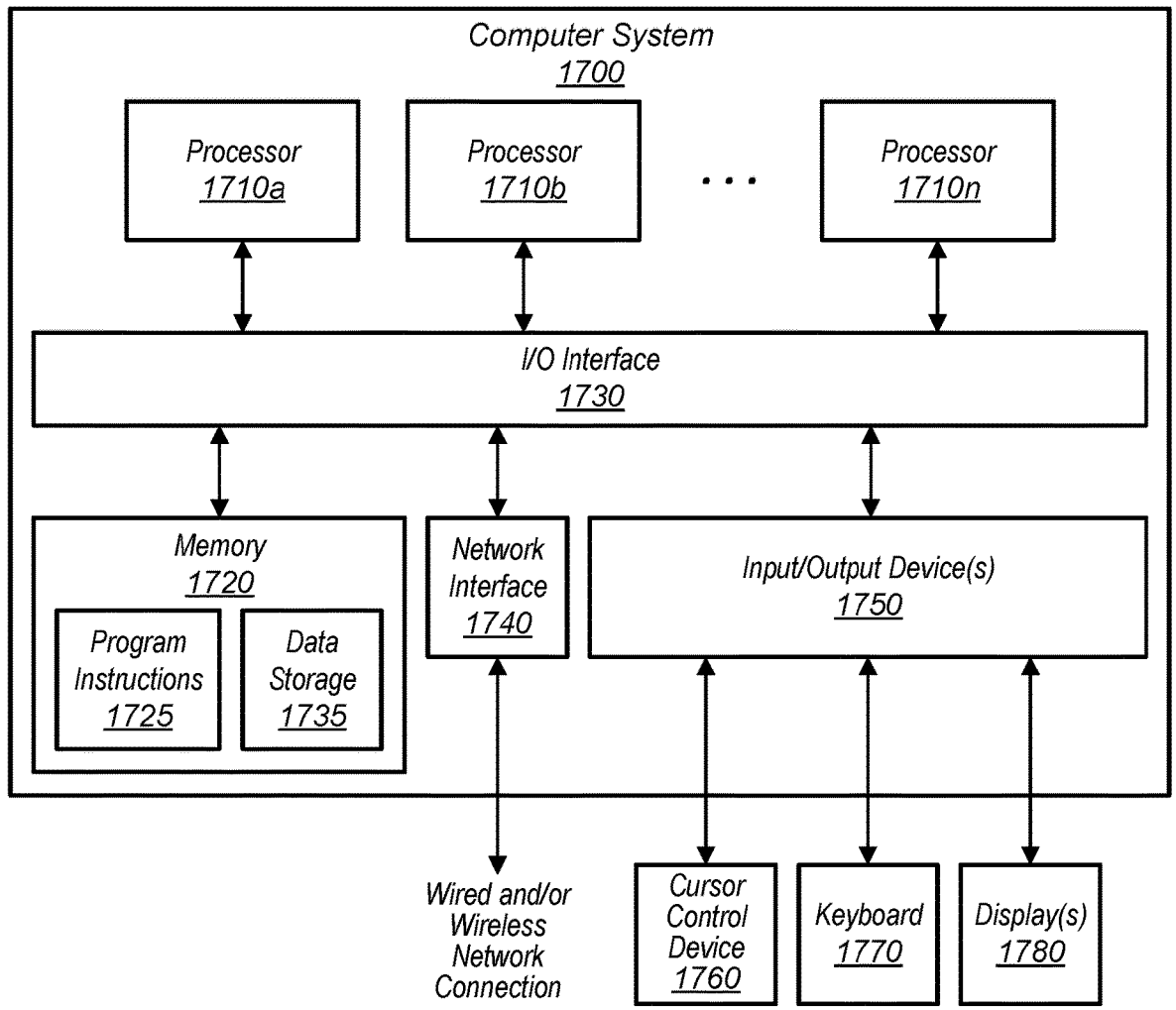
FIG. 17 is a block diagram illustrating an example computer system that implements some or all of the techniques described herein, according to some embodiments.

Any of various computer systems may be configured to implement processes associated with connection and application state migration for uninterrupted service availability. For example, FIG. 17 is a block diagram illustrating one embodiment of a computer system suitable for implementing at least some of the systems and methods described herein. In various embodiments, the provider network may include one or more computer systems 1700 such as that illustrated in FIG. 17 or one or more components of the computer system 1700 that function in a same or similar way as described for the computer system 1700.

In the illustrated embodiment, computer system 1700 includes one or more processors 1710 coupled to a system memory 1720 via an input/output (I/O) interface 1730. Computer system 1700 further includes a network interface 1740 coupled to I/O interface 1730. In some embodiments, computer system 1700 may be illustrative of servers implementing enterprise logic or downloadable application, while in other embodiments servers may include more, fewer, or different elements than computer system 1700.

In various embodiments, computer system 1700 may be a uniprocessor system including one processor 1710, or a multiprocessor system including several processors 1710 (e.g., two, four, eight, or another suitable number). Processors 1710 may be any suitable processors capable of executing instructions. For example, in various embodiments, processors 1710 may be embedded processors implementing any of a variety of instruction set architectures (ISAs), such as the x106, PowerPC, SPARC, or MIPS ISAs, or any other suitable ISA. In multiprocessor systems, each of processors 1710 may commonly, but not necessarily, implement the same ISA.

System memory 1720 may be configured to store instructions and data accessible by processor 1710. In various embodiments, system memory 1720 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the downloadable software or provider network are shown stored within system memory 1720 as program instructions 1725. In some embodiments, system memory 1720 may include data 1735 which may be configured as described herein.

In one embodiment, I/O interface 1730 may be configured to coordinate I/O traffic between processor 1710, system memory 1720 and any peripheral devices in the system, including through network interface 1740 or other peripheral interfaces. In some embodiments, I/O interface 1730 may perform any necessary protocol, timing or other data transformations to convert data signals from one component (e.g., system memory 1720) into a format suitable for use by another component (e.g., processor 1710). In some embodiments, I/O interface 1730 may include support for devices attached through various types of peripheral buses, such as a variant of the Peripheral Component Interconnect (PCI) bus standard or the Universal Serial Bus (USB) standard, for example. In some embodiments, the function of I/O interface 1730 may be split into two or more separate components, such as a north bridge and a south bridge, for example. Also, in some embodiments, some or all of the functionality of I/O interface 1730, such as an interface to system memory 1720, may be incorporated directly into processor 1710.

Network interface 1740 may be configured to allow data to be exchanged between computer system 1700 and other devices attached to a network, such as between the shippable storage device 100 and other computer systems, for example. In particular, network interface 1740 may be configured to allow communication between computer system 1700 and/or various I/O devices 1750. I/O devices 1750 may include scanning devices, display devices, input devices and/or other communication devices, as described herein. Network interface 1740 may commonly support one or more wireless networking protocols (e.g., Wi-Fi/IEEE 802.7, or another wireless networking standard). However, in various embodiments, network interface 1740 may support communication via any suitable wired or wireless general data networks, such as other types of Ethernet networks, for example. Additionally, network interface 1740 may support communication via telecommunications/telephony networks such as analog voice networks or digital fiber communications networks, via storage area networks such as Fibre Channel SANs, or via any other suitable type of network and/or protocol.

In some embodiments, system memory 1720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 1700 via I/O interface 1730. A computer-readable storage medium may also include any volatile or non-volatile media such as RAM (e.g. SDRAM, DDR SDRAM, RDRAM, SRAM, etc.), ROM, etc., that may be included in some embodiments of computer system 1700 as system memory 1720 or another type of memory. Further, a computer-accessible medium may include transmission media or signals such as electrical, electromagnetic, or digital signals, conveyed via a communication medium such as a network and/or a wireless link, such as may be implemented via network interface 1740.

In some embodiments, I/O devices 1750 may be relatively simple or "thin" client devices. For example, I/O devices 1750 may be configured as dumb terminals with display, data entry and communications capabilities, but otherwise little computational functionality. However, in some embodiments, I/O devices 1750 may be computer systems configured similarly to computer system 1700, including one or more processors 1710 and various other devices (though in some embodiments, a computer system 1700 implementing an I/O device 1750 may have somewhat different devices, or different classes of devices).

In various embodiments, I/O devices 1750 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 1750 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 1700. In general, an I/O device 1750 (e.g., cursor control device, keyboard, or display(s) may be any device that can communicate with elements of computing system 1700.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
a plurality of computing devices of a provider network, the plurality of computing devices comprising respective hardware processors and memory, and configured to implement a socket service for a plurality of clients, wherein the plurality of computing devices comprises:
one or more computing devices configured to implement a socket manager to provide an interface for users to establish client-defined function mappings for sockets hosted by the socket service for communicating with respective client devices, wherein the socket manager is configured to:
receive, via the interface, a plurality of configuration requests from different clients to establish different client-defined function mappings, wherein the plurality of configuration requests from different clients specify different endpoints for different functions to be associated with different sockets;
receive, via the interface, a configuration request from a particular client to establish a particular client-defined function mapping, wherein the configuration request specifies an endpoint for a function to be associated with one or more sockets to be opened by the socket service at a subsequent time; and
based on the configuration request received from the particular client, store a client-defined function mapping associating an endpoint identifier with the endpoint; and
a plurality of computing devices configured to implement a plurality of socket hosts, wherein individual ones of the socket hosts are configured to:
in response to a request from one of the client devices of the particular client to open a socket, open a socket on the socket host, wherein the request from the client device of the particular client to open the socket is distinct from the configuration request from the particular client and the plurality of configuration requests and is received subsequent to the configuration request from the particular client;
identify the particular client-defined function mapping according to an identifier received from the client device that matches the endpoint identifier, wherein the client-defined function mapping identifies the endpoint;
associate the identified client-defined function mapping with the socket on the socket host;
send an identifier associated with the client device to the particular endpoint identified in the client-defined function mapping associated with the socket;
receive from the endpoint, a socket identifier for another socket associated with another of the client devices; and
link the socket to the other socket, wherein data received at the socket from the client device is forwarded to the other socket for transmission to the other client device or data received at the other socket from the other client device is forwarded to the socket for transmission to the client device.

2. The system as recited in claim 1, wherein the provider network further comprises an event-driven compute service that is associated with one or more client-registered functions, and wherein the endpoint is an endpoint for the event-driven compute service, and wherein to send the identifier associated with the client device to the particular endpoint, the socket host is configured to:
send the identifier associated with the client device and an identifier for a client-registered function to the event-driven compute service, wherein the event-driven compute service invokes the client-registered function.

3. The system as recited in claim 1, wherein the endpoint is an endpoint for a function provider external to the provider network or a compute instance of the provider network, and wherein to send the identifier associated with the client device to the particular endpoint, the socket host is configured to:
send the identifier associated with the client device to the function provider external to the provider network or to the compute instance of the provider network.

4. The system as recited in claim 1, wherein the other socket is hosted by another socket host, and wherein the socket host is further configured to:
determine that one or more migration criteria are met to migrate a connection for the client device from the socket host to the other socket host; and
in response to determining that the one or more migration criteria to migrate the connection are met, send a connection state for the connection from the socket host to the other socket host, wherein the other socket host is configured to:
open a new socket and associate the client-defined function mapping with the new socket,
link the new socket and the other socket; and
apply the connection state for the connection at the other socket host, wherein data for the connection for the client device is routed via the new socket.

5. The system as recited in claim 4, wherein the one or more migration criteria comprises one or more of:
the other socket host satisfying a host exclusivity requirement;
a load on the socket host exceeding a pre-defined threshold;
a load on the other socket host being below a pre-defined threshold; or
a communication delay between the socket host and the other socket host exceeding a pre-defined threshold.

6. A method, comprising:
performing, by one or more computing devices of a provider network that implements a socket service for a plurality of clients:
receive, by a socket manager, a plurality of configuration requests from different clients to establish different client-defined function mappings, wherein the plurality of configuration requests from different clients specify different endpoints for different functions to be associated with different sockets;
receiving, by the socket manager from a particular client, a configuration request to establish a particular client-defined function mapping, wherein the configuration request specifies an endpoint for a function to be associated with one or more sockets to be opened by the socket service at a subsequent time, and wherein the socket manager is usable to establish client-defined function mappings for sockets hosted by the socket service for communicating with respective client devices;
based on the configuration request received from the particular client, storing a client-defined function mapping associating an endpoint identifier with the endpoint;
in response to receiving a request from a client device of the particular client to open a socket, opening a socket on a socket host, wherein the request from the client device of the particular client to open the socket is distinct from the configuration request from the particular client and the plurality of configuration requests and is received subsequent to the configuration request from the particular client; and
receiving, at the socket hosted by the socket host, data from a client device and forwarding the data to another socket for transmission to another client device or receiving, at the other socket, other data from another client device and forwarding the other data to the socket for transmission to the client device, wherein the client-defined function mapping is associated with the socket.

7. The method as recited in claim 6, further comprising:
identifying the particular client-defined function mapping according to an identifier received from the client device that matches the endpoint identifier, wherein the client-defined function mapping identifies the endpoint;
associating the identified client-defined function mapping with the socket on the socket host;
sending an identifier associated with the client device to the endpoint identified in the client-defined function mapping associated with the socket; and
receiving from the endpoint a socket identifier for the other socket associated with the other client device.

8. The method as recited in claim 7, wherein the endpoint is an endpoint for an event-driven compute service of the provider network that is associated with one or more client-registered functions, and wherein sending the identifier associated with the client device to the endpoint comprises:
sending the identifier associated with the client device and an identifier for a client-registered function to the event-driven compute service, wherein the event-driven compute service invokes the client-registered function.

9. The method as recited in claim 7, wherein the endpoint is an endpoint for a function provider external to the provider network or a compute instance of the provider network, and wherein sending the identifier associated with the client device to the endpoint comprises:
sending the identifier associated with the client device to the function provider external to the provider network or to the compute instance of the provider network.

10. The method as recited in claim 6, wherein the other socket is hosted by another socket host, and wherein the method further comprises:
determining that one or more migration criteria are met to migrate a connection for the client device from the socket host to the other socket host; and
in response to determining that the one or more migration criteria to migrate the connection are met, sending a connection state for the connection from the socket host to the other socket host;
opening, at the other socket host, a new socket and associating the client-defined function mapping with the new socket,
linking the new socket and the other socket; and
applying the connection state for the connection at the other socket host, wherein data for the connection for the client device is routed via the new socket.

11. The method as recited in claim 10, wherein the one or more migration criteria comprises one or more of:
a load on the socket host exceeding a pre-defined threshold;
a load on the other socket host being below a pre-defined threshold; or
a communication delay between the socket host and the other socket host exceeding a pre-defined threshold.

12. The method as recited in claim 6, further comprising:
prior to transmitting the data to the other client device, modifying the data, or
prior to transmitting the other data to the client device, modifying the other data.

13. The method as recited in claim 6, further comprising:
prior to receiving, at the socket hosted by the socket host, data from the client device or the other socket:
receiving, at the socket host, credentials from the client device;
authenticating the client device based on the credentials and user account data of the provider network; and
in response to authenticating the client device, establishing, at the socket host, a secure session for the client device.

14. The method as recited in claim 6, wherein the request further specifies a timeout threshold to be associated with the one or more sockets, and further comprising:

storing the timeout threshold as part of the client-defined function mapping; and in response to determining that data has not been sent between the socket and the other socket within the timeout threshold, closing the socket.

15. A non-transitory computer-readable storage medium storing program instructions that, when executed by a socket host for a socket service of a provider network, cause the socket host to implement:

in response to a request from a client device of a particular client to open a socket, opening, on the socket host, the socket associated with the client device;

identifying a particular one of a plurality of client-defined function mappings according to an identifier received from the client device that matches an endpoint identifier of the particular client-defined function mapping, wherein the plurality of client-defined function mappings are for sockets hosted by the socket service for communicating with respective client devices, wherein the particular client-defined function mapping identifies a particular endpoint, wherein the particular client-defined function mapping is established based on a configuration request previously received from the particular client, wherein the request from the client device of the particular client to open the socket is distinct from the configuration request from the particular client and a plurality of configuration requests and is received subsequent to the configuration request from the particular client, and wherein the socket service receives the plurality of configuration requests from different clients to establish different mappings of the plurality of client-defined function mappings, wherein the plurality of configuration requests from different clients specify different endpoints for different functions to be associated with different sockets;

associating the client-defined function mapping with the socket on the socket host;

sending an identifier associated with the client device to the particular endpoint identified in the client-defined function mapping associated with the socket;

receiving an indication that the socket is to be linked with another socket associated with another client device; and in response to receiving the indication that the socket is to be linked with another socket, causing the socket to enter a waiting state, wherein the socket remains open for at least a threshold amount of time.

16. The non-transitory, computer-readable storage medium of claim 15, wherein the program instructions cause the socket host to further implement:

receiving a socket identifier assigned to the other socket on another socket host associated with the other client device; and in response to receiving from the endpoint the socket identifier, linking the socket to the other socket, wherein data received at the socket from the client device is forwarded to the other socket for transmission to the other client device or data received at the other socket from the other client device is forwarded to the socket for transmission to the client device.

17. The non-transitory, computer-readable storage medium of claim 16, wherein the other socket is hosted by another socket host, and wherein the program instructions cause the socket host to further implement:

determining that one or more migration criteria are met to migrate a connection for the client device from the socket host to the other socket host; and in response to determining that the one or more migration criteria to migrate the connection are met, sending a connection state for the connection from the socket host to the other socket host in order to migrate the connection to the other socket host.

18. The non-transitory, computer-readable storage medium of claim 17, wherein the one or more migration criteria comprises one or more of:

a load on the socket host exceeding a pre-defined threshold;

a load on the other socket host being below a pre-defined threshold; or a communication delay between the socket host and the other socket host exceeding a pre-defined threshold.

19. The non-transitory, computer-readable storage medium of claim 15, wherein the provider network further comprises an event-driven compute service that is associated with one or more client-registered functions, and wherein the endpoint is an endpoint for the event-driven compute service, and wherein to send the identifier associated with the client device to the particular endpoint, the program instructions cause the socket host to implement:

sending the identifier associated with the client device and an identifier for a client-registered function to the event-driven compute service, wherein the event-driven compute service invokes the client-registered function.

20. The non-transitory, computer-readable storage medium of claim 15, wherein the endpoint is an endpoint for a function provider external to the provider network or a compute instance of the provider network, and wherein to send the identifier associated with the client device to the particular endpoint, the program instructions cause the socket host to implement:

sending the identifier associated with the client device to the function provider external to the provider network or to the compute instance of the provider network.

* * * * *